US010978726B2

(12) United States Patent
Miller et al.

(10) Patent No.: US 10,978,726 B2
(45) Date of Patent: Apr. 13, 2021

(54) DOPED SCANDIA STABILIZED ZIRCONIA ELECTROLYTE COMPOSITIONS

(71) Applicant: BLOOM ENERGY CORPORATION, San Jose, CA (US)

(72) Inventors: David N. Miller, St. Andrews (GB); Cristian Savaniu, St. Andrews (GB); John T S Irvine, St. Andrews (GB); Tad Armstrong, Burlingame, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 16/406,961

(22) Filed: May 8, 2019

(65) Prior Publication Data

US 2019/0312294 A1    Oct. 10, 2019

Related U.S. Application Data

(62) Division of application No. 15/340,625, filed on Nov. 1, 2016, now Pat. No. 10,381,673, which is a division of application No. 14/083,708, filed on Nov. 19, 2013, now Pat. No. 9,515,344.

(60) Provisional application No. 61/792,699, filed on Mar. 15, 2013, provisional application No. 61/728,270, filed on Nov. 20, 2012.

(51) Int. Cl.
*H01M 8/1253* (2016.01)
*H01M 8/124* (2016.01)

(52) U.S. Cl.
CPC .. *H01M 8/1253* (2013.01); *H01M 2008/1293* (2013.01); *Y02E 60/50* (2013.01); *Y02P 70/50* (2015.11)

(58) Field of Classification Search
None
See application file for complete search history.

(56) References Cited

U.S. PATENT DOCUMENTS

| 4,052,532 A | 10/1977 | Tannenberger et al. |
| 4,272,353 A | 6/1981 | Lawrance et al. |
| 4,426,269 A | 1/1984 | Brown et al. |
| 4,459,340 A | 7/1984 | Mason |

(Continued)

FOREIGN PATENT DOCUMENTS

| CN | 101147285 A | 3/2008 |
| CN | 101295792 A | 10/2008 |

(Continued)

OTHER PUBLICATIONS

Ahmad-Khantou et al., "Electrochemical & Microstructural Study of SOFC Cathodes Based on $La_{0.5}Sr_{0.3}MnO_3$ and $Pr_{0.65}Sr_{0.3}MnO_3$," Electrochemical Society Proceedings, 2001, p. 476-485, vol. 2001-16.

(Continued)

*Primary Examiner* — Haroon S. Sheikh
(74) *Attorney, Agent, or Firm* — The Marbury Law Group PLLC

(57) ABSTRACT

A solid oxide fuel cell (SOFC) electrolyte composition includes zirconia stabilized with scandia, and at least one of magnesia, zinc oxide, indium oxide, and gallium oxide, and optionally ceria in addition to the oxides above.

3 Claims, 39 Drawing Sheets

(56) References Cited

U.S. PATENT DOCUMENTS

| | | |
|---|---|---|
| 4,575,407 A | 3/1986 | Diller |
| 4,686,158 A | 8/1987 | Nishi et al. |
| 4,791,079 A | 12/1988 | Hazbun |
| 4,792,502 A | 12/1988 | Trocciola et al. |
| 4,804,592 A | 2/1989 | Vanderborgh et al. |
| 4,847,173 A | 7/1989 | Mitsunaga et al. |
| 4,898,792 A | 2/1990 | Singh et al. |
| 4,913,982 A | 4/1990 | Kotchick et al. |
| 4,917,971 A | 4/1990 | Farooque |
| 4,925,745 A | 5/1990 | Remick et al. |
| 4,983,471 A | 1/1991 | Reichner et al. |
| 5,034,287 A | 7/1991 | Kunz |
| 5,047,299 A | 9/1991 | Shockling |
| 5,143,800 A | 9/1992 | George et al. |
| 5,162,167 A | 11/1992 | Minh et al. |
| 5,169,730 A | 12/1992 | Reichner et al. |
| 5,170,124 A | 12/1992 | Blair et al. |
| 5,171,645 A | 12/1992 | Khandkar |
| 5,192,334 A | 3/1993 | Rohr et al. |
| 5,213,910 A | 5/1993 | Yamada |
| 5,215,946 A | 6/1993 | Minh |
| 5,256,499 A | 10/1993 | Minh et al. |
| 5,273,837 A | 12/1993 | Aiken et al. |
| 5,290,323 A | 3/1994 | Okuyama et al. |
| 5,290,642 A | 3/1994 | Minh et al. |
| 5,302,470 A | 4/1994 | Okada et al. |
| 5,342,705 A | 8/1994 | Minh et al. |
| 5,368,667 A | 11/1994 | Minh et al. |
| 5,441,821 A | 8/1995 | Merritt et al. |
| 5,498,487 A | 3/1996 | Ruka et al. |
| 5,501,914 A | 3/1996 | Satake et al. |
| 5,505,824 A | 4/1996 | McElroy |
| 5,518,829 A | 5/1996 | Satake et al. |
| 5,527,631 A | 6/1996 | Singh et al. |
| 5,573,867 A | 11/1996 | Zafred et al. |
| 5,589,017 A | 12/1996 | Minh |
| 5,589,285 A | 12/1996 | Cable et al. |
| 5,601,937 A | 2/1997 | Isenberg |
| 5,686,196 A | 11/1997 | Singh et al. |
| 5,688,609 A | 11/1997 | Rostrup-Nielsen et al. |
| 5,733,675 A | 3/1998 | Dederer et al. |
| 5,741,406 A | 4/1998 | Barnett et al. |
| 5,741,605 A | 4/1998 | Gillett et al. |
| 5,922,488 A | 7/1999 | Marucchi-Soos et al. |
| 5,942,349 A | 8/1999 | Badwal et al. |
| 5,955,039 A | 9/1999 | Dowdy |
| 5,993,989 A | 11/1999 | Baozhen et al. |
| 6,013,385 A | 1/2000 | DuBose |
| 6,051,125 A | 4/2000 | Pham et al. |
| 6,106,964 A | 8/2000 | Voss et al. |
| 6,228,521 B1 | 5/2001 | Kim et al. |
| 6,238,816 B1 | 5/2001 | Cable et al. |
| 6,280,865 B1 | 8/2001 | Eisman et al. |
| 6,287,716 B1 | 9/2001 | Hashimoto et al. |
| 6,329,090 B1 | 12/2001 | McElroy et al. |
| 6,361,892 B1 | 3/2002 | Ruhl et al. |
| 6,403,245 B1 | 6/2002 | Hunt |
| 6,436,562 B1 | 8/2002 | DuBose |
| 6,451,466 B1 | 9/2002 | Grasso et al. |
| 6,489,050 B1 | 12/2002 | Ruhl et al. |
| 6,495,279 B1 | 12/2002 | Bogicevic et al. |
| 6,558,831 B1 | 5/2003 | Doshi et al. |
| 6,582,845 B2 | 6/2003 | Helfinstine et al. |
| 6,592,965 B1 | 7/2003 | Gordon |
| 6,605,316 B1 | 8/2003 | Visco |
| 6,623,880 B1 | 9/2003 | Geisbrecht et al. |
| 6,677,070 B2 | 1/2004 | Kearl |
| 6,682,842 B1 | 1/2004 | Visco et al. |
| 6,767,662 B2 | 7/2004 | Jacobson et al. |
| 6,787,261 B2 | 9/2004 | Ukai |
| 6,803,141 B2 | 10/2004 | Pham et al. |
| 6,811,913 B2 | 11/2004 | Ruhl |
| 6,821,663 B2 | 11/2004 | McElroy et al. |
| 6,854,688 B2 | 2/2005 | McElroy et al. |
| 6,924,053 B2 | 8/2005 | McElroy |
| 6,972,161 B2 | 12/2005 | Beatty et al. |
| 6,979,511 B2 | 12/2005 | Visco et al. |
| 7,150,927 B2 | 12/2006 | Hickey et al. |
| 7,157,173 B2 | 1/2007 | Kwon |
| 7,255,956 B2 | 8/2007 | McElroy et al. |
| 7,494,732 B2 | 2/2009 | Roy et al. |
| 7,550,217 B2 | 6/2009 | Kwon et al. |
| 7,563,503 B2 | 7/2009 | Gell et al. |
| 7,601,183 B2 | 10/2009 | Larsen |
| 8,580,456 B2 | 11/2013 | Armstrong et al. |
| 9,515,344 B2 | 12/2016 | Miller et al. |
| 2001/0049035 A1 | 12/2001 | Haltiner, Jr. et al. |
| 2002/0012825 A1 | 1/2002 | Sasahara et al. |
| 2002/0014417 A1 | 2/2002 | Kuehnle et al. |
| 2002/0028362 A1 | 3/2002 | Prediger et al. |
| 2002/0028367 A1 | 3/2002 | Sammes et al. |
| 2002/0058175 A1 | 5/2002 | Ruhl |
| 2002/0098406 A1 | 7/2002 | Huang et al. |
| 2002/0106544 A1 | 8/2002 | Noetzel et al. |
| 2002/0127455 A1 | 9/2002 | Pham et al. |
| 2002/0132156 A1 | 9/2002 | Ruhl et al. |
| 2003/0152067 A1 | 8/2003 | McElroy |
| 2003/0165732 A1 | 9/2003 | McElroy |
| 2003/0196893 A1 | 10/2003 | McElroy et al. |
| 2004/0081859 A1 | 4/2004 | McElroy et al. |
| 2004/0191595 A1 | 9/2004 | McElroy et al. |
| 2004/0191597 A1 | 9/2004 | McElroy |
| 2004/0191598 A1 | 9/2004 | Gottmann et al. |
| 2004/0202914 A1 | 10/2004 | Sridhar et al. |
| 2004/0224193 A1 | 11/2004 | Mitlitsky et al. |
| 2004/0229031 A1 | 11/2004 | Gell et al. |
| 2004/0265484 A1 | 12/2004 | Pham et al. |
| 2004/0265663 A1 | 12/2004 | Badding et al. |
| 2005/0048334 A1 | 3/2005 | Sridhar et al. |
| 2005/0074650 A1 | 4/2005 | Sridhar et al. |
| 2005/0164051 A1 | 7/2005 | Venkataraman et al. |
| 2005/0214616 A1 | 9/2005 | Kumar et al. |
| 2005/0227134 A1 | 10/2005 | Nguyen |
| 2005/0271919 A1 | 12/2005 | Hata et al. |
| 2006/0008682 A1 | 1/2006 | McLean et al. |
| 2006/0040168 A1 | 2/2006 | Sridhar |
| 2006/0110633 A1 | 5/2006 | Ukai et al. |
| 2006/0166070 A1 | 7/2006 | Hickey et al. |
| 2006/0199057 A1 | 9/2006 | Hiwatashi |
| 2006/0216575 A1 | 9/2006 | Cassidy |
| 2006/0222929 A1 | 10/2006 | Hickey et al. |
| 2007/0045125 A1 | 3/2007 | Hartvigsen et al. |
| 2007/0082254 A1 | 4/2007 | Hiwatashi |
| 2007/0141422 A1 | 6/2007 | Brown |
| 2007/0141423 A1 | 6/2007 | Suzuki et al. |
| 2007/0141443 A1 | 6/2007 | Brown |
| 2007/0141444 A1 | 6/2007 | Brown |
| 2007/0224481 A1 | 9/2007 | Suzuki et al. |
| 2007/0237999 A1 | 10/2007 | Donahue et al. |
| 2007/0275292 A1 | 11/2007 | Sin Xicola et al. |
| 2007/0287048 A1 | 12/2007 | Couse et al. |
| 2008/0029388 A1 | 2/2008 | Elangovan et al. |
| 2008/0075984 A1 | 3/2008 | Badding et al. |
| 2008/0076006 A1 | 3/2008 | Gottmann et al. |
| 2008/0096080 A1 | 4/2008 | Batawi et al. |
| 2008/0102337 A1 | 5/2008 | Shimada |
| 2008/0254336 A1 | 10/2008 | Batawi |
| 2008/0261099 A1 | 10/2008 | Nguyen et al. |
| 2009/0029195 A1 | 1/2009 | Gauckler et al. |
| 2009/0068533 A1 | 3/2009 | Fukasawa et al. |
| 2009/0186250 A1 | 7/2009 | Narendar et al. |
| 2009/0214919 A1 | 8/2009 | Suzuki |
| 2009/0291347 A1 | 11/2009 | Suzuki |
| 2009/0305106 A1 | 12/2009 | Gell et al. |
| 2011/0039183 A1 | 2/2011 | Armstrong et al. |
| 2011/0183233 A1 | 7/2011 | Armstrong et al. |
| 2012/0231368 A1* | 9/2012 | Hata .......... C04B 35/6261 429/491 |
| 2014/0051010 A1 | 2/2014 | Armstrong et al. |

(56) References Cited

U.S. PATENT DOCUMENTS

2014/0141344 A1   5/2014   Miller et al.
2017/0117567 A1   4/2017   Miller et al.

FOREIGN PATENT DOCUMENTS

| CN | 102725902 A | 10/2012 |
|---|---|---|
| GB | 1048839 A | 11/1966 |
| JP | 3196465 A | 8/1991 |
| JP | H06150943 A | 5/1994 |
| JP | 6215778 | 8/1994 |
| JP | 2000-340240 | 8/2000 |
| JP | 2000-281438 | 10/2000 |
| JP | 2003-068324 A | 3/2003 |
| JP | 2004-087490 A | 3/2004 |
| JP | 2007-026874 A | 2/2007 |
| JP | 2008-502113 A | 1/2008 |
| JP | 2008-189838 A | 8/2008 |
| JP | 2008189838 A | 8/2008 |
| JP | 2008-305804 A | 12/2008 |
| JP | 2009-059699 A | 3/2009 |
| KR | 20020092223 A | 12/2002 |
| KR | 20070095440 A | 9/2007 |
| KR | 20080010737 A | 1/2008 |
| KR | 20080097971 | 11/2008 |
| KR | 100886239 B1 | 2/2009 |
| KR | 20090061870 A | 6/2009 |
| TW | 201233731 A | 8/2012 |
| WO | WO2004/093214 | 10/2004 |
| WO | WO2005/041329 | 5/2005 |
| WO | WO2008/019926 | 2/2008 |
| WO | WO2009/097110 | 8/2009 |

OTHER PUBLICATIONS

Mori et al., "Lanthanum Alkaline-Earth Manganites as a Cathode Material in High-Temperature Solid Oxide Fuel Cells," Journal of the Electrochemical Society, 1999, p. 4041-4047, vol. 146.
L.G. Austin, "Cell & Stack Construction: Low Temperature Cells," NASA SP-120, 1967.
EG & G Services, Parsons, Inc., SAIC, Fuel Cell Handbook, 5th Edition, USDOE, Oct. 2000, p. 9-1-9.4, and 9-12-9-14.
J.M. Sedlak, et al., "Hydrogen Recovery and Purification Using the Solid Polymer Electrolyte Electrolysis Cell," Int. J. Hydrogen Energy, vol. 6, p. 45-51, 1981.
Dr. Ruhl, "Low Cost Reversible Fuel Cell System," Proceedings of the 2000 U.S. DOE Hydrogen Program Review, Jun. 15, 2000, NREL/CP-570-30535.
Low Cost, Compact Solid Oxide Fuel Cell Generator, NASA Small Business Innovation Research Program, 2001.
Low Cost, High Efficiency Reversible Fuel Cell (and Electrolyzer) Systems, Proceedings of the 2001 DOE Hydrogen Program Review NREL/CP-570-30535.
Milliken et al., "Low Cost, High Efficiency Reversible Fuel Cell Systems," Proceedings of the 2002 U.S. DOE Hydrogen Program Review, NREL/CP-610-32405.
K. Eguchi et al., Power Generation and Steam Electrolysis Characteristics of an Electrochemical Cell with a Zirconia or Ceria based Electrode, Solid State Ionics, 86 88, 1996, p. 1245-49.

F. Mitlitsky et al , "Regenerative Fuel Cells for High Altitude Long Endurance Solar Powered Aircraft," 28$^{th}$ Intersociety Energy Conversion Engineering Conference (IECED), Jul. 28, 1993, UCRL-JC-113485.
Small, Ultra Efficient Fuel Cell Systems, Advanced Technology Program, ATP 2001 Competition, Jun. 2002.
F. Mitlitsky et al., Unitized Regenerative Fuel Cells for Solar Rechargeable Aircraft and Zero Emission Vehicles, 1994 Fuel Cell Seminar, Sep. 6, 1994, UCRL-JC-117130.
Ralph et al., "Cathode Materials for Reduced-Temperature SOFCs," Journal of the Electrochemical Society, 2003, p. A1518-A1522, vol. 150.
Simmer et al., "Development of Fabrication Techniques and Electrodes for Solid Oxide Fuel Cells," Electrochemcial Society Proceedings, p. 1050-1061, vol. 2001-16.
Yamamoto et al., "Electrical Conductivity of Stabilized Zirconia with Ytterbia and Scandia," Solid State Ionics, v79, p. 137-142, Jul. 1995.
Araki et al., "Degradation Mechanism of Scandia-Stabilized Zirconia Electrolytes: Discussion based on Annealing Effects on Mechanical Strength, Ionic Conductivity, and Raman Spectrum," Solid State Ionics, v180, n28-31, p. 1484-1489, Nov. 2009.
Lybye et al., "Effect of Transition Metal Ions on the Conductivity and Stability of Stabilized Zirconia," Ceramic Engineering and Science Proceedings, v27, n4, p. 67-78, 2006.
International Application No. PCT/US2011/021664, International Preliminary Report on Patentability, dated Aug. 9, 2012.
International Application No. PCT/US2013/070783, International Search Report and Written Opinion, dated Mar. 10, 2014.
Chinese Patent Application No. 201180006935.5, Office Action dated Jun. 13, 2014.
Chinese Patent Application No. 201380060253.1, Office Action dated Sep. 2, 2016, 11pgs.
Chinese Patent Application No. 201380060253.1, Office Action dated Apr. 27, 2017, 14pgs.
Chinese Patent Application No. 201380060253.1, Office Action dated Dec. 21, 2017, 4pgs.
Chinese Patent Application No. 201380060253.1, Office Action dated May 28, 2018.
Taiwan Patent Application No. 100102963, Office Action dated May 6, 2014.
Taiwan Patent Application No. 100102963, Taiwan Search Report dated May 6, 2014.
Taiwan Patent Application No. 102142390, Office Action dated Jan. 19, 2017, 5 pgs.
Taiwan Patent Application No. 105134369, Office Action dated Mar. 7, 2018, 3pgs.
Taiwan Patent Application No. 105134369, Office Action dated Sep. 25, 2018.
International Application No. PCT/US2011/021664, International Search Report dated Sep. 28, 2011.
International Application No. PCT/US2013/070783, International Preliminary Report on Patentability dated Jun. 4, 2015.
Japanese Application No. 2015-543115, Notice of Reasons for Rejection, dated Sep. 7, 2017, 4pgs.
Japanese Application No. 2018-091247, Notice of Reasons for Rejection, dated May 22, 2019, 5 pgs.
Office Communication with Search Report from the Taiwanese Patent Office for ROC (Taiwan) Patent Application No. 108115947, dated Nov. 27, 2019, 4 pages.

* cited by examiner

ND SCANDIA STABILIZED ZIRCONIA
DOPED SCANDIA STABILIZED ZIRCONIA ELECTROLYTE COMPOSITIONS

FIELD

The present invention is generally directed to fuel cell components, and to solid oxide fuel cell electrolyte materials in particular.

BACKGROUND OF THE INVENTION

Fuel cells are electrochemical devices which can convert chemical energy stored in fuels to electrical energy with high efficiencies. They comprise an electrolyte between electrodes. Solid oxide fuel cells (SOFCs) are characterized by the use of a solid oxide as the electrolyte.

In solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, pentane, ethanol, or methanol. The fuel cell, operating at a typical temperature between 650° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

In recent years considerable interest has been shown towards the development of SOFC electrolyte compositions of high ionic conductivity. Doped cerium oxide, lanthanum gallate and zirconium oxide are the most suitable candidates. However, in order to achieve sufficient ionic conductivity high operation temperature is often required, deteriorating the life of the fuel cell components and requiring the use of expensive materials in the fuel cell stack, such as chromium alloy interconnects. Therefore, it is highly desirable to lower the operation temperature of SOFCs and one important step to achieve this is the development of an electrolyte composition with higher ionic conductivity than yttria-stabilized zirconia (YSZ), the state of the art SOFC electrolyte material.

Doping zirconia with aliovalent dopants stabilizes the high temperature cubic fluorite phase at room temperature leading to an increase in oxygen vacancy concentration, oxygen mobility and ionic conductivity. Complex studies have demonstrated a correlation between the dopant and host ionic radii and the existence of a critical dopant cation radius that can ensure maximum conductivity. It has been suggested that a good evaluation of the relative ion mismatch between dopant and host would be to compare the cubic lattice parameter of the host oxide and the pseudocubic lattice parameter of the dopant oxide, a smaller size mismatch being preferred for obtaining high ionic conductivity.

Numerous attempts to find the appropriate dopant for stabilizing the cubic phase have been made (Y, Yb, Ce, Bi, etc). Among these, scandia stabilized zirconia shows the highest ionic conductivity with $Sc^{3+}$ concentration of 11 mole % (2-3 higher than YSZ at 800° C.) due to a lower activation energy than YSZ. The complex phase diagram in the $Sc_2O_3$—$ZrO_2$ system is still under debate, with several phases identified in the dopant rich segment of the phase diagram, as monoclinic, tetragonal and rhombohedral intermediate phases appear at low temperatures. One example is the distorted rhombohedral β phase ($Sc_2Zr_7O_{17}$), that undergoes a rhombohedral-cubic phase transition around 600-700° C. and induces a steep decrease in conductivity in this temperature region. This transition is not favorable from the point of view of thermal expansion mismatch and may be related to order-disorder transition of oxygen vacancies.

Co-doping in zirconia systems may produce cheaper, stable compositions with enhanced ionic conductivity. Co-dopants in the scandia zirconia system include Ce, Y, Yb and Ti, the former (1 mole % $CeO_2$) being the most successful to date in stabilizing the cubic phase at room temperature and very high conductivity values have been measured by Lee et al, 135 mS/cm at 800° C. in air (SSI 176 (1-2) 33-3 (2005)). However, concerns about long term stability, especially at the interface with the fuel electrode, due to $Ce^{3+}$ presence, have been reported.

In general, CaO or MgO are used for improving the toughness of zirconia ceramics by stabilizing the tetragonal phase at room temperature.

However, previous studies for doping zirconia with alkaline earth metal cations alone have been unsuccessful in improving the conductivity because of a high tendency of defect association and a lower thermodynamic stability of cubic fluorite $ZrO_2$—CaO and $ZrO_2$—MgO solid solutions.

SUMMARY OF THE INVENTION

A solid oxide fuel cell (SOFC) electrolyte composition includes zirconia stabilized with scandia, and at least one of magnesia, zinc oxide, indium oxide, and gallium oxide, and optionally ceria.

Another embodiment of the invention provides an electrolyte composition for a solid oxide fuel cell that includes zirconia stabilized with scandia and indium oxide, in which scandia and indium oxide are present in total amount that is greater than or equal to 10 mol % and less than or equal to 13 mol %. Another embodiment of the invention provides zirconia stabilized with scandia, indium oxide, and ceria, in which scandia, indium oxide, and ceria are present in a total amount that is greater than or equal to 8 mol % and less than or equal to 14 mol %, such as 11 mol %.

DETAILED DESCRIPTION OF THE EMBODIMENTS

The various embodiments provide compositions of an electrolyte for a SOFC which includes a doped scandia stabilized zirconia. In an embodiment, zirconia is co-doped with scandium and aliovalent atoms and is made by co-precipitation.

As both phase composition and conductivity may be very much dependant on the synthesis conditions, numerous studies have focused on developing technologies for synthesis and sintering. Solid state synthesis is known to lead to phase inhomogeneity due to the slow kinetics for cation migration, therefore high sintering temperatures may be required for phase formation. Alternative techniques such as co-precipitation, combustion and sol-gel may prove to be more successful in achieving compositional homogeneity and high extent of densification.

In the various embodiments, powder may be obtained using co-precipitation, which includes dissolving stoichiometric amounts of scandium, and at least one of magnesium oxide or carbonate, zinc oxide, indium oxide and/or gallium oxide (and optionally yttrium oxide in addition to the above oxides depending on the composition) in hot $HNO_3$ followed by mixing with and aqueous solution in which zirconium acetylacetonate or other Zr precursor compound has been dissolved. The mixture may be stirred under heating on a hot plate then cooled down to room temperature and precipitated with ammonia until pH=9. The formed precipitate may be filtrated, dried and calcined at 1200° C. for 5 hours. The resulting powder may be crushed, ball milled and pressed into pellets and bars to be sintered to dense bodies at 1500-1550° C. for 7 hours. The sintered product may be characterised using X-ray diffraction, particle size analysis, SEM, TEM and conductivity measurements. To obtain an accurate value of the ionic conductivity at high temperatures, the bulk and grain boundary contributions to the total resistance of the sample may be separated out.

In preparing these new electrolyte compositions, a parent electrolyte material may have a molar ratio of zirconia ($ZrO_2$): scandia ($Sc_2O_3$) that is around 89:11, such as 87-91:13-9. In an embodiment, zirconia may be doped with magnesia (MgO), or other ionic oxide with an aliovalent cation (e.g., $Mg^{2+}$), up to 11% mole percent (mol %), while keeping the atomic percent of either Sc or Zr constant. In other embodiments, zirconia may be doped with a combination of one or more of magnesia, yttria, zinc oxide, and/or indium oxide. In other embodiments, zirconia may be doped with a combination of one or more of magnesia, yttria, and gallium oxide.

In an embodiment, magnesia may be used as a dopant that replaces scandia in scandia stabilized zirconia. Four example series of compositions are discussed in further detail below.

Figure 1A:
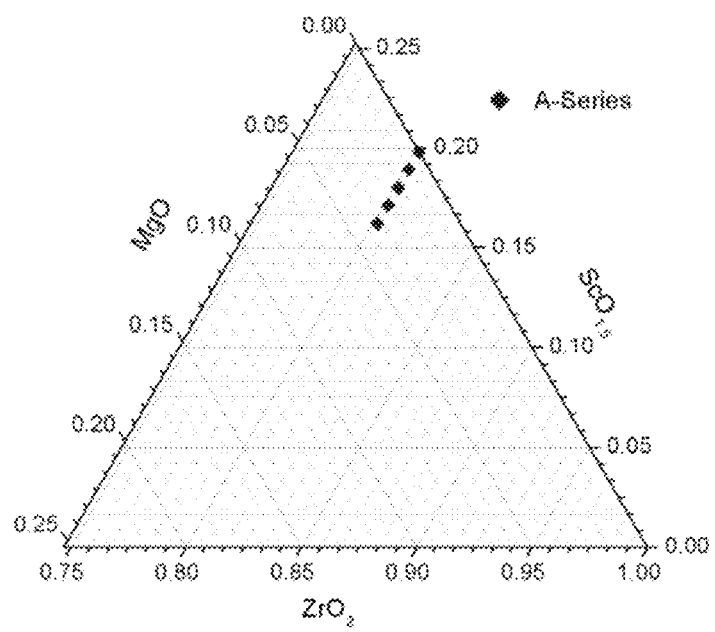
FIGS. 1A-1D are ternary phase diagrams illustrating embodiment series of magnesia doped scandia stabilized zirconia compositions.

One example series of compositions ("A-series") may be prepared based on the composition of 11 mol % $Sc_2O_3$, and may have a formula of $Zr_{0.802}Sc_{0.198-x}Mg_xO_{1.90-0.5x}$. A ternary phase diagram showing the compositions of this example A-series is illustrated in FIG. 1A. In the A-series compositions, $Sc^{3+}$ ions may be replaced by $Mg^{2+}$ ions in a 1:1 ratio, thereby lowering scandium and oxygen content of the composition, while keeping zirconia content constant. The x values in the above formula that may be used to form the A-series are: 0, 0.009, 0.018, 0.027 and 0.036, thereby creating the following compositions:

A0: $Zr_{0.802}Sc_{0.198}O_{1.90}$
A1: $Zr_{0.802}Sc_{0.189}Mg_{0.009}O_{1.90}$
A2: $Zr_{0.802}Sc_{0.180}Mg_{0.018}O_{1.89}$
A3: $Zr_{0.802}Sc_{0.171}Mg_{0.027}O_{1.89}$
A4: $Zr_{0.802}Sc_{0.162}Mg_{0.036}O_{1.88}$

In this example series, at x=0, no $Sc^{3+}$ ions are replaced, and therefore the atomic percent of $Sc^{3+}$ ions is equal to the atomic percent in the parent material (i.e., 19.8%). At the highest x value tested (x=0.36), the atomic percent of scandium ions becomes the lowest (i.e., 16.2%).

Figure 1B:
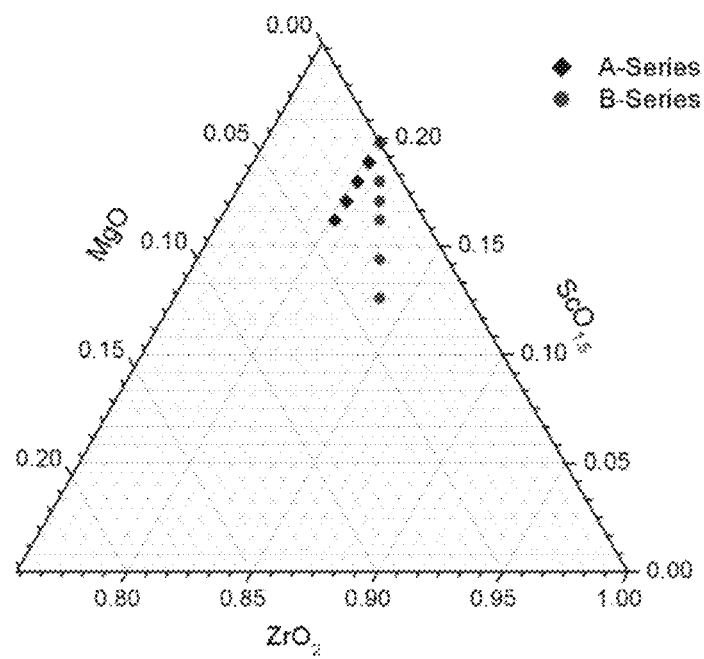

Another example series of compositions ("B-series") may be prepared based on the composition of 11 mol % $Sc_2O_3$. A formula for the B-series compositions may be $Zr_{0.802+x}Sc_{0.198-2x}Mg_xO_{1.90}$. FIG. 1B is a ternary phase diagram showing the compositions of the B-series. In this example series, two $Sc^{3+}$ ions may be replaced by one $Zr^{4+}$ and one $Mg^{2+}$ ion, thereby lowering scandium content while keeping the oxygen content and stoichiometry constant at 1.90. The x values that may be used to form this B-series are: 0, 0.009, 0.0135, 0.018 0.027 and 0.036, thereby creating the following compositions:

B0: $Zr_{0.802}Sc_{0.198}O_{1.90}$
B1: $Zr_{0.811}Sc_{0.18}Mg_{0.009}O_{1.90}$
B1.5: $Zr_{0.815}Sc_{0.171}Mg_{0.0135}O_{1.90}$
B2: $Zr_{0.820}Sc_{0.162}Mg_{0.018}O_{1.90}$
B3: $Zr_{0.829}Sc_{0.144}Mg_{0.027}O_{1.90}$
B4: $Zr_{0.838}Sc_{0.126}Mg_{0.036}O_{1.90}$

In this example series, at x=0, no $Sc^{3+}$ ions are replaced, and therefore the atomic percent of $Sc^{3+}$ ions is equal to the atomic percent in the parent material (i.e., 19.8%). At the highest x value tested (x=0.036), the atomic percent of scandium ions is the lowest (i.e., 12.6%). A ternary phase diagram showing the compositions of this example B-series is illustrated in FIG. 1B.

Figure 1C:
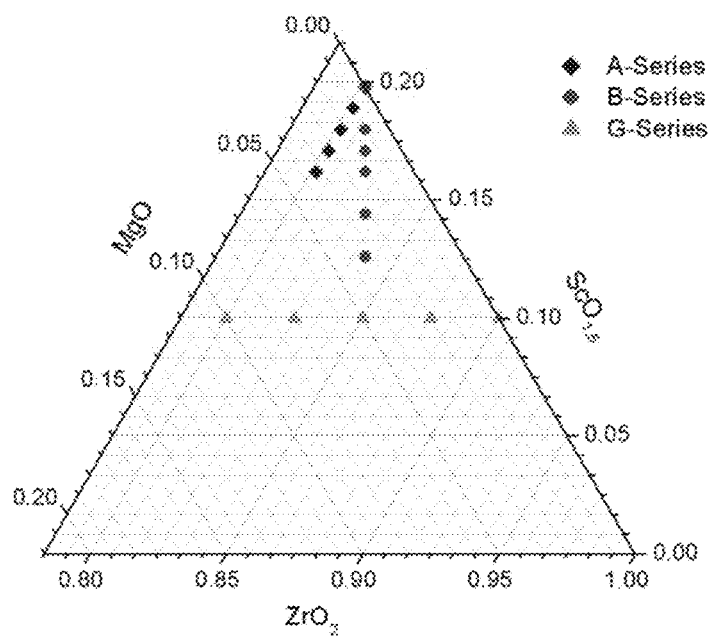

Other example series of compositions ("G-series" and "H-series") may maintain constant scandia content and increase magnesia levels by replacing Zr ions with Mg ions, thereby lowering the levels of zirconium and oxygen. The example G-series of compositions may be prepared based on a parent composition with 5.3 mol % $Sc_2O_3$, and may have a formula of $Zr_{0.9-x}Sc_{0.1}Mg_xO_{1.95-x}$. A ternary phase diagram showing the compositions in this example G-series is illustrated in FIG. 1C. The x values that may be used to form the G-series compositions are: 0, 0.025, 0.05, 0.075 and 0.10, thereby creating the following compositions:

G0: $Zr_{0.9}Sc_{0.1}O_{1.95}$
G1: $Zr_{0.875}Sc_{0.1}Mg_{0.025}O_{1.925}$
G2: $Zr_{0.85}Sc_{0.1}Mg_{0.05}O_{1.90}$
G3: $Zr_{0.825}Sc_{0.1}Mg_{0.075}O_{1.875}$
G4: $Zr_{0.80}Sc_{0.1}Mg_{0.10}O_{1.85}$

At x=0, no $Mg^{2+}$ ions are added, and therefore the atomic percent of $Sc^{3+}$ ions is equal to the atomic percent in the parent material (i.e., 10.0%). At the highest x value (x=0.10), the atomic percent of zirconium ions is the lowest (i.e., 80.0%).

Figure 1D:
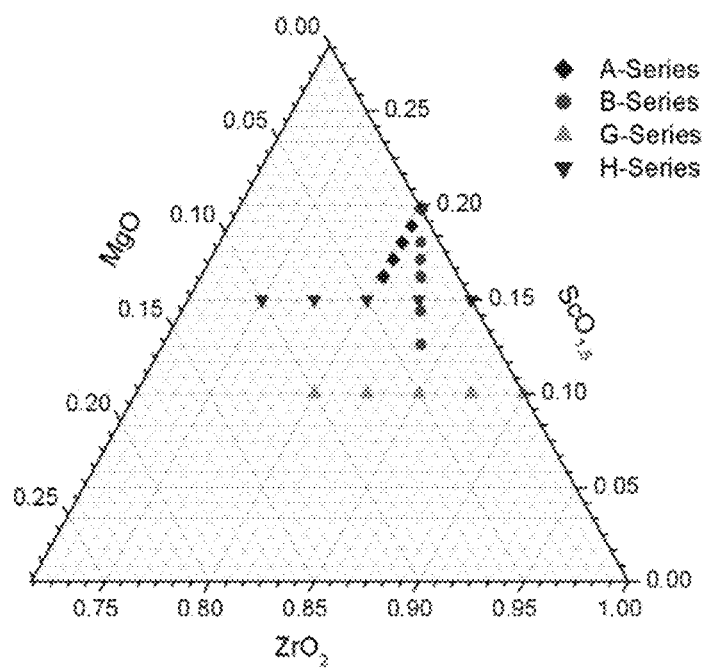

Another example series of compositions ("H-series") may be prepared based on a parent composition of 8.1 mol % $Sc_2O_3$. The H-series compositions may have a formula $Zr_{0.85-x}Sc_{0.15}Mg_xO_{1.925-x}$. A ternary phase diagram showing the example H-series compositions is illustrated in FIG. 1D. The x values that may be used to form the H-series compositions are: 0, 0.025, 0.05, 0.075 and 0.10, thereby creating the following compositions:

H0: $Zr_{0.85}Sc_{0.15}O_{1.925}$
H1: $Zr_{0.825}Sc_{0.15}Mg_{0.025}O_{1.90}$
H2: $Zr_{0.80}Sc_{0.15}Mg_{0.05}O_{1.875}$
H3: $Zr_{0.775}Sc_{0.15}Mg_{0.075}O_{1.85}$
H4: $Zr_{0.75}Sc_{0.15}Mg_{0.10}O_{1.825}$

X-ray diffraction patterns may determine the stable phase at room temperature for each magnesia doped scandia stabilized zirconia composition. The phases at room temperature for compositions in the example A-, B-, G-, and H-series of compositions are shown in Table 1 below:

| Composition | Phases Present | Spacegroup |
| --- | --- | --- |
| A0, B0 | Rhombohedral | R-3C |
| A1 | Rhombohedral | R-3C |
| A2 | Cubic | Fm-3m |
| A3 | Cubic | Fm-3m |

| Composition | Phases Present | Spacegroup |
| --- | --- | --- |
| A4 | Cubic | Fm-3m |
| B1 | Tetragonal | P42 nmc |
| B1-5 | Tetragonal | P42 nmc |
| B2 | Tetragonal | P42 nmc |
| B3 | Tetragonal | P42 nmc |
| B4 | Tetragonal | P42 nmc |
| G0 | Tetragonal + monoclinic | P42 nmc + |
| G1 | Tetragonal + monoclinic | P42 nmc + |
| G2 | Tetragonal + monoclinic | P42 nmc + |
| G3 | Tetragonal + monoclinic | P42 nmc + |
| G4 | Tetragonal + monoclinic | P42 nmc + |
| H0 | Tetragonal | P42 nmc |
| H1 | Tetragonal | P42 nmc |
| H2 | Cubic | Fm-3m |
| H3 | Cubic | Fm-3m |
| H4 | Tetragonal | P42 nmc |

Figure 2A:
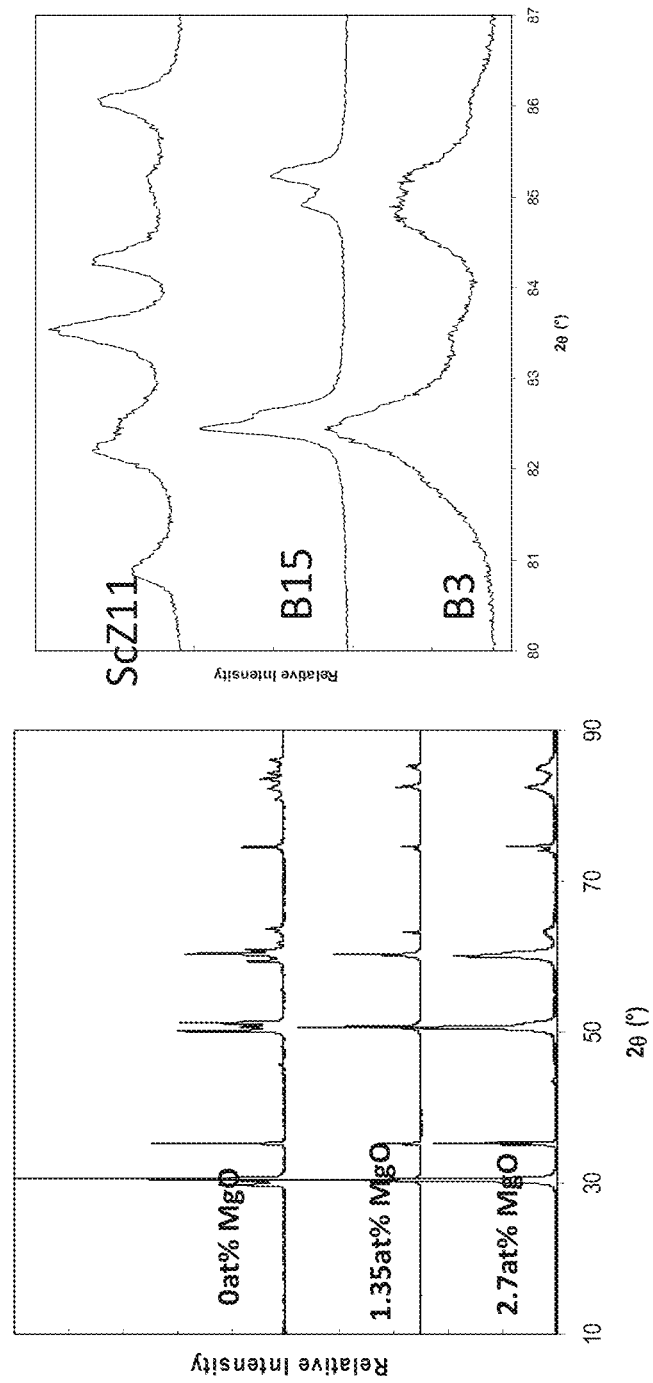
FIGS. 2A-2D are plots showing x-ray diffraction patterns for compositions in embodiment series of magnesia doped scandia stabilized zirconia compositions.

Previous studies of the parent composition A0, B0 of the A and B-series, 11 mol % $Sc_2O_3$, have found it to have a rhombohedral structure at room temperature. At the lowest level of doping in the A-series of compositions (x=0.09), the structure may remain rhombohedral, while at all other doping levels the cubic fluorite structure may be stable. For the example B-series, all compositions may have a tetragonal fluorite structure. FIG. 2A illustrates an x-ray diffraction patterns for the example B-Series compositions.

Figure 2B:
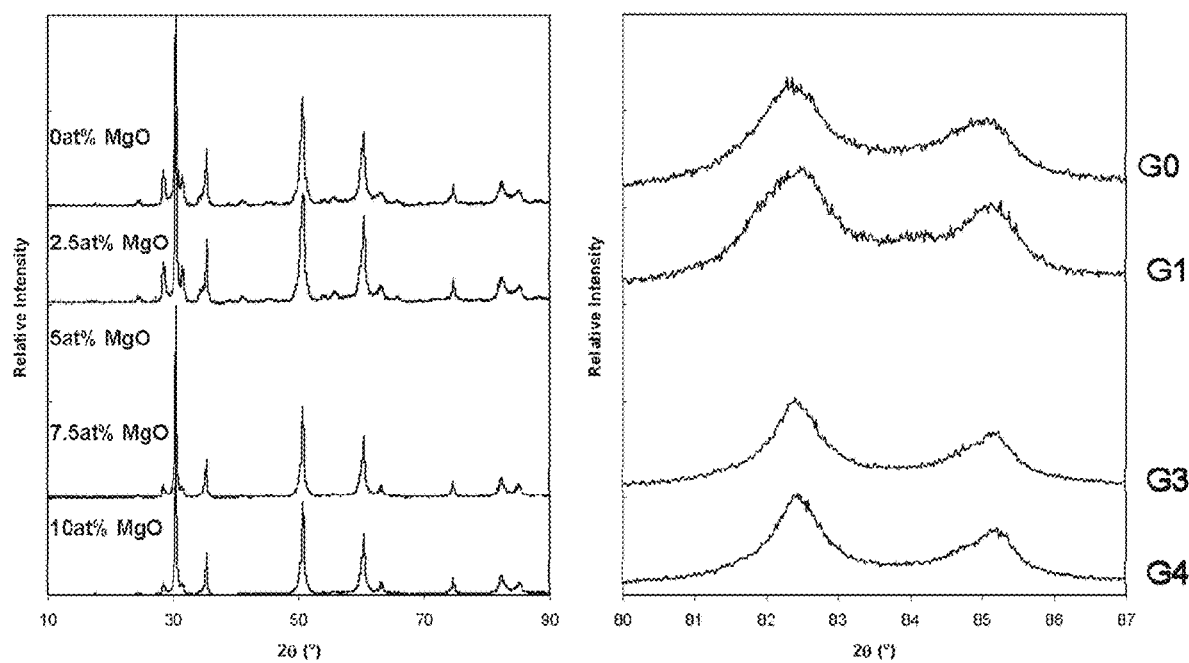
Figure 2C:
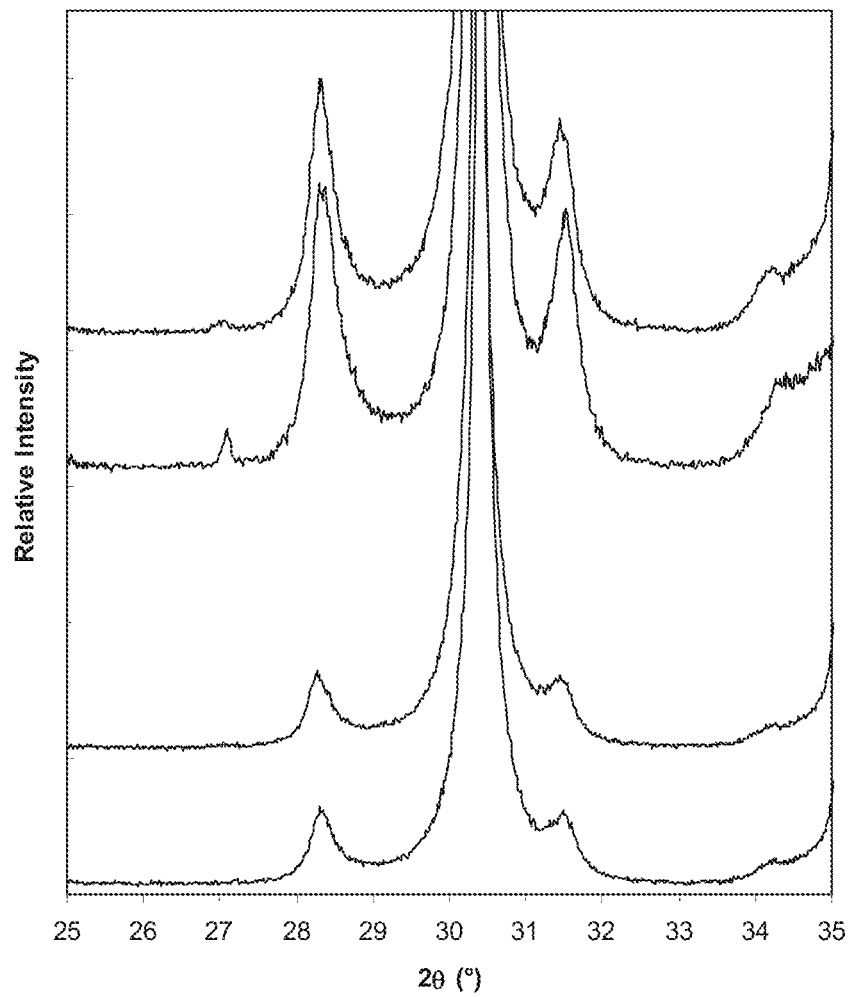

X-ray analysis of the magnesium free G0 sample showed both tetragonal and monoclinic fluorite phases to be present, consistent with findings by Ruh et al. (Ruh 1977), in their study. FIG. 2B illustrates x-ray diffraction (XRD) patterns for G-series compositions, which show that increasing the magnesia content across the G-Series leads to a reduction in the amount of monoclinic phase present. For example, FIG. 2C, which is a close up view of the low angle region in FIG. 2B illustrates x-ray diffraction patterns for G-series compositions, which show relative peak heights of the monoclinic reflections reduce with increasing magnesia content.

Figure 2D:
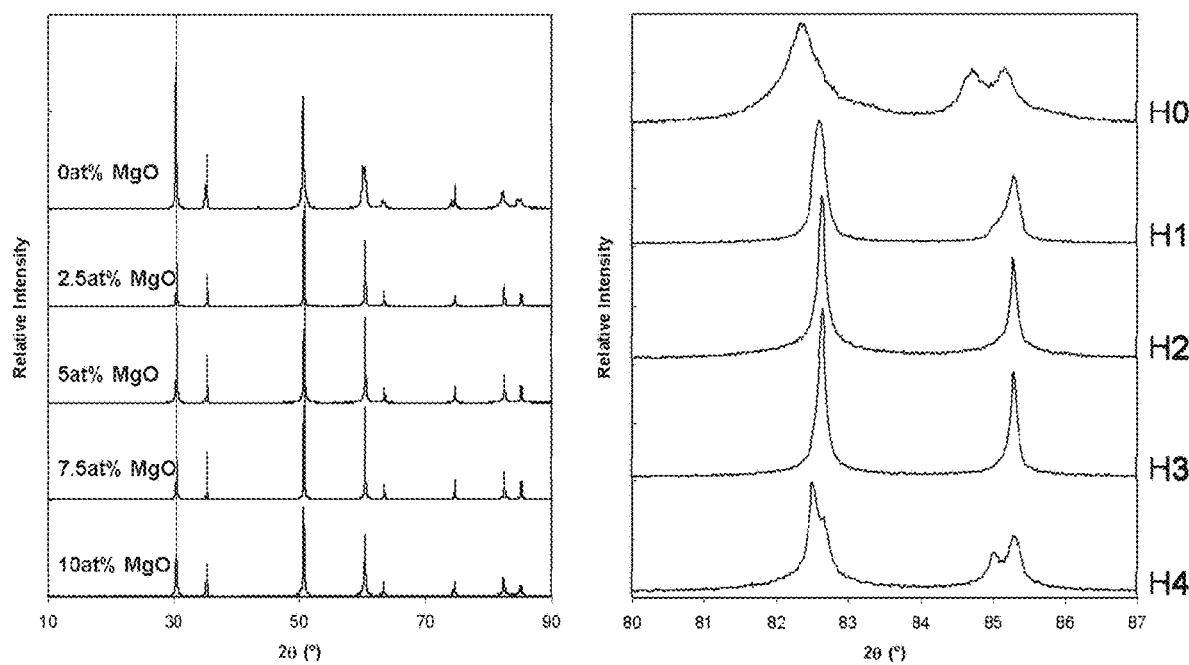
Figure 3:
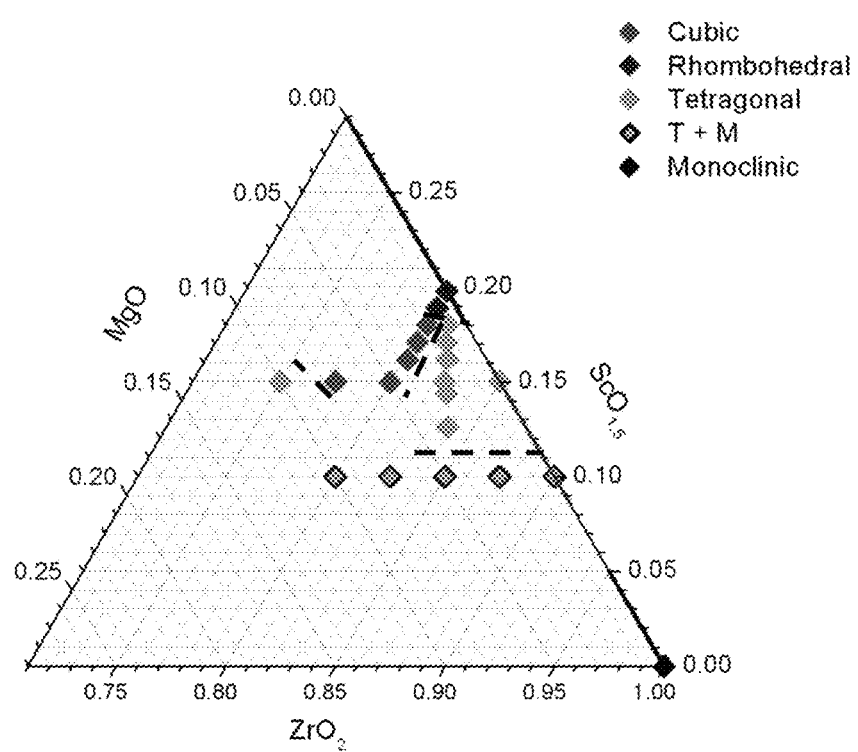
FIG. 3 is a ternary phase diagram illustrating the structures of compositions in embodiment series of magnesia doped scandia stabilized zirconia compositions.

With respect to the H-series of compositions, additions of MgO with between 2.5 and 7.5 at. % magnesium stabilize the cubic phase. When the magnesium content is increased to 2.5 at. % the structure may remain tetragonal, but when the magnesium content is further increased to 5.0 and 7.5 at. %, the cubic structure may be stabilized. A further increase in magnesium content to 10 at. % tetragonal structure may become stable. This is shown in FIG. 2D which is an XRD pattern series for the H-series compositions. A ternary phase diagram showing as fired phases for the B-, G- and H-series compositions is illustrated in FIG. 3.

Figure 4A:
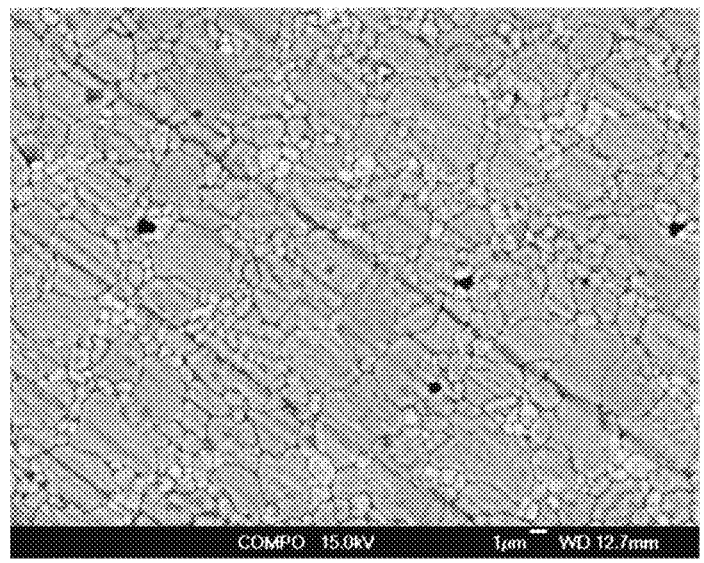
FIGS. 4A and 4B are back scattered electron images from sample compositions in embodiment series of magnesia doped scandia stabilized zirconia compositions.
Figure 4B:
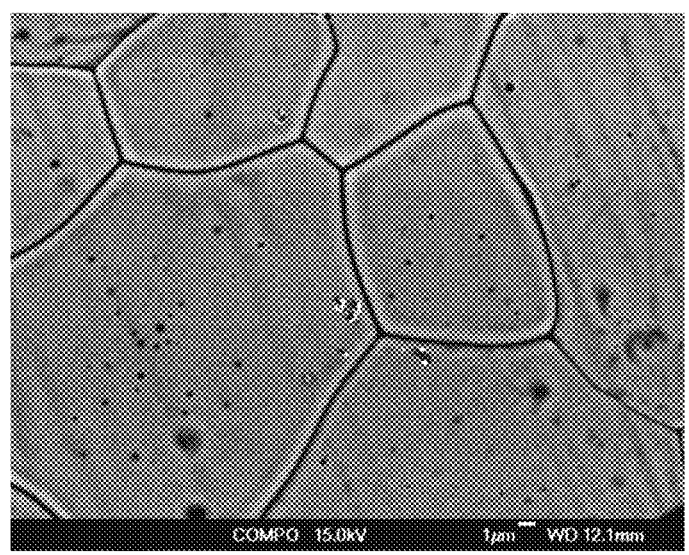

FIGS. 4A and 4B are back scattered electron (BSE) images from samples B2 and H2 respectively, taken using a scanning electron microscope (SEM). As shown by the data, sample G2 may have a much finer grain structure, which is consistent with the presence of tetragonal and monoclinic zirconia. In contrast sample H2 may have a much coarser microstructure, typical of cubic zirconia.

Figure 5A:
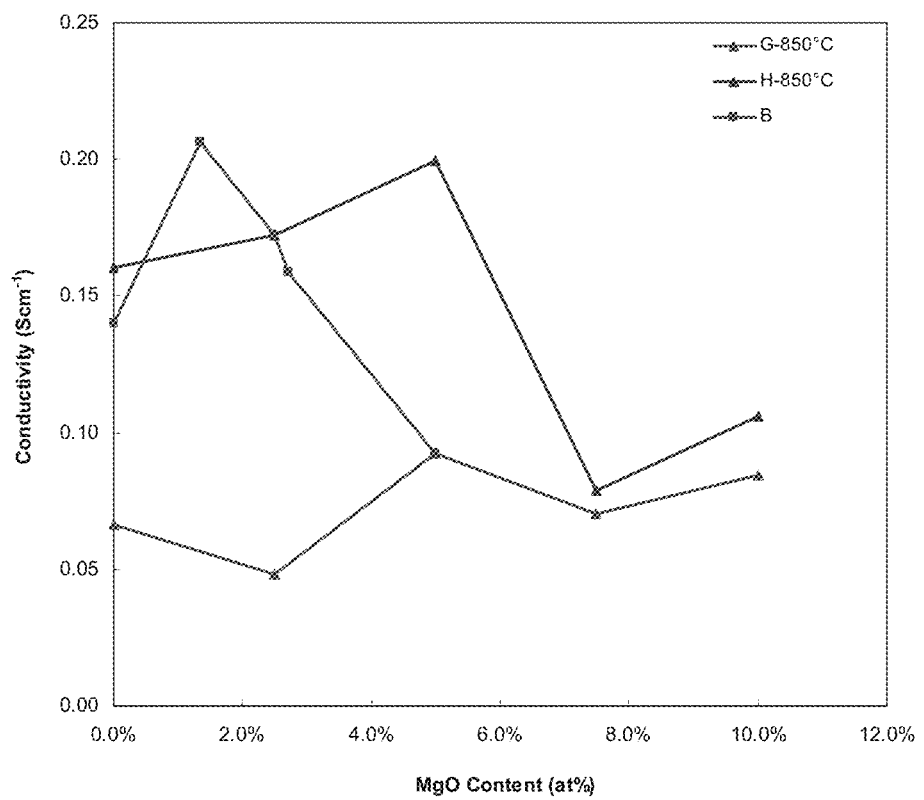
FIG. 5A is a graph showing D.C. conductivity versus atomic percent of magnesium ions at 850° C. for embodiment series of magnesia doped scandia stabilized zirconia compositions.

FIG. 5A illustrates the variation of example D.C. conductivity measurements with magnesium content (measured atomic percent of magnesium) at 850° C. for the B, G and H-Series of compositions. Peak conductivity may be measured at or above 200 mS/cm, such as 200-210 mS/cm for the B1.5 composition ($Zr_{0.815}Sc_{0.171}Mg_{0.0135}O_{1.90}$)

Regarding the G-series of compositions, conductivity may remain less than 100 m/Scm across the entire range of compositions. These relatively low conductivities may be consistent with XRD results that show the presence of unwanted low conductivity monoclinic phases at room temperature. These low results may also indicate that G-series levels of magnesia and scandia are likely insufficient to stabilize the more conductive cubic phase of zirconia at 850° C. In contrast, the example H-series of compositions may show conductivities above 150 mS/cm, such as 150-199 mS/cm at compositions with 5.0 at. % magnesium or less. The conductivity may increase approximately linearly with magnesia content to a peak value of 199 mS/cm for the H2 sample, (5.0 at. % magnesium). A further increase to 7.5 at. % magnesium may lead to a large drop in conductivity to 79 mS/cm.

Figure 5B:
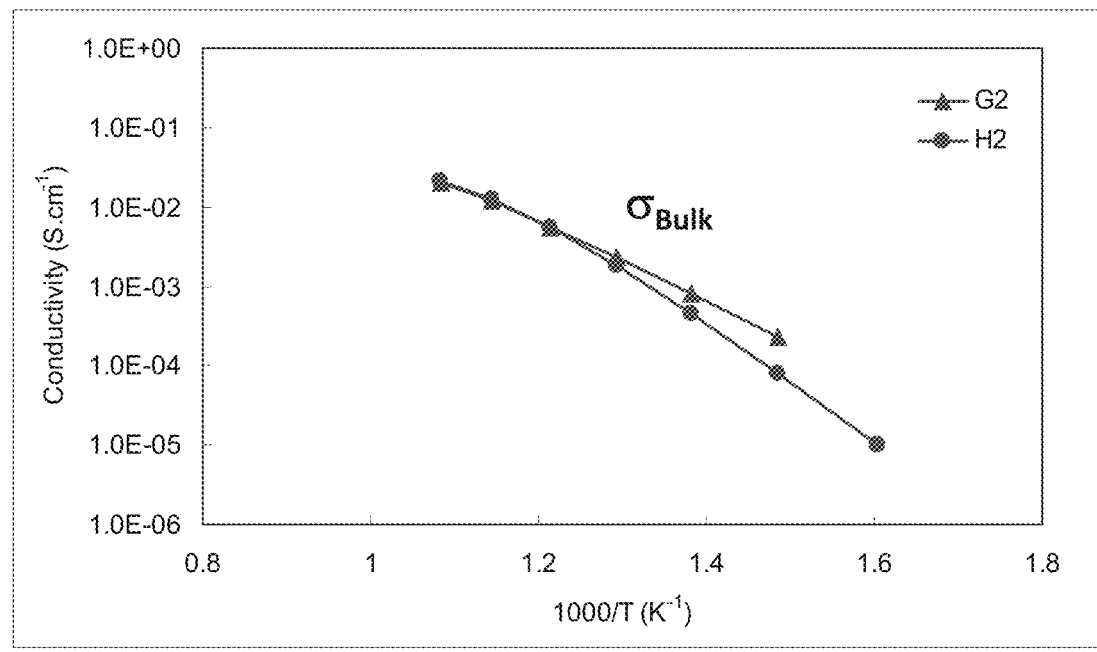
FIGS. 5B-5G are graphs showing electrical impedance spectroscopy results for sample compositions in embodiment series of magnesia doped scandia stabilized zirconia compositions.
Figure 5C:
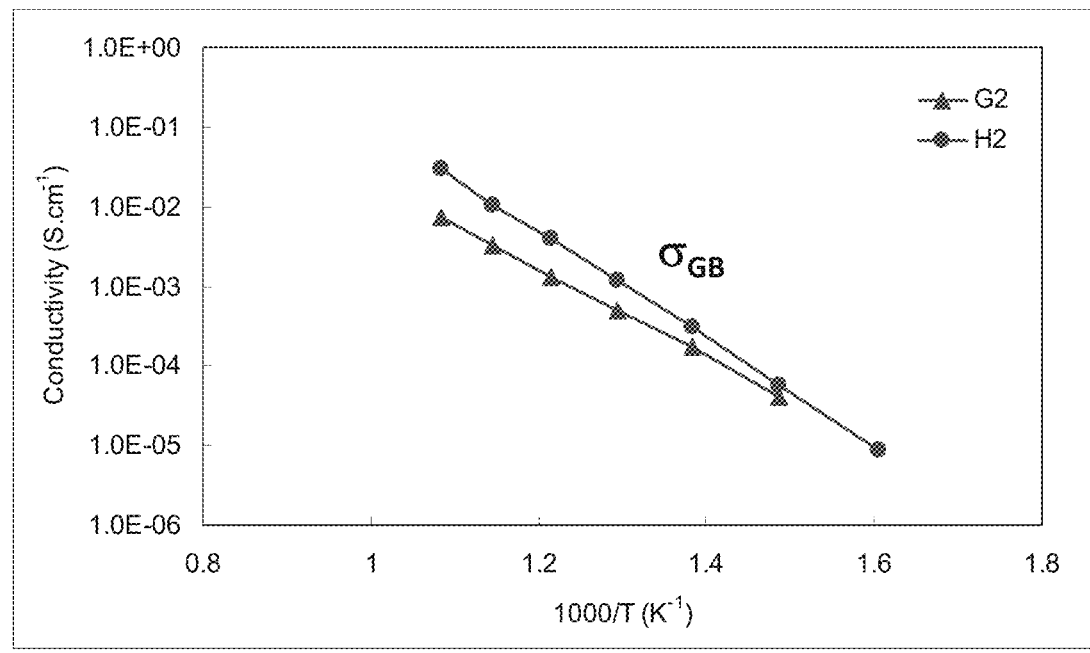

FIG. 5B illustrates electrical impedance spectroscopy (EIS) measurements showing bulk conductivity for the sample G2 and H2 compositions with 5 at. % magnesium. FIG. 5C illustrates EIS measurements showing conductivity across the grain boundary of the sample G2 and H2 compositions. At 400° C. the low scandia G2 sample may have a higher bulk conductivity but lower grain boundary conductivity than the higher scandia H2 sample. As temperature increases the bulk and grain boundary component of the conductivity may increase faster for the higher scandia sample, leading to the far superior conductivity at 850° C. Without wishing to be bound by a particular theory, the large grain boundary resistance of the G-series phase may be the result of the presence of the lower conductivity monoclinic phase.

Figure 5D:
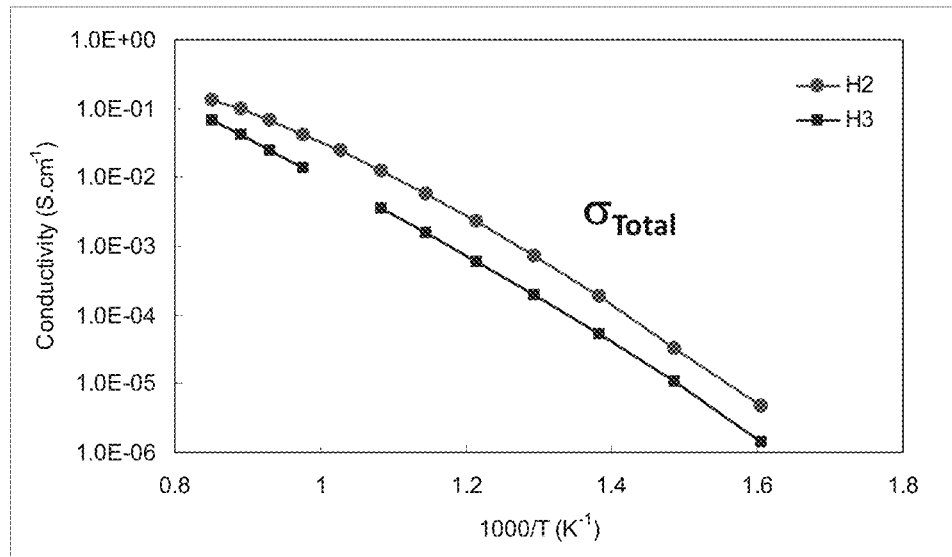
Figure 5E:
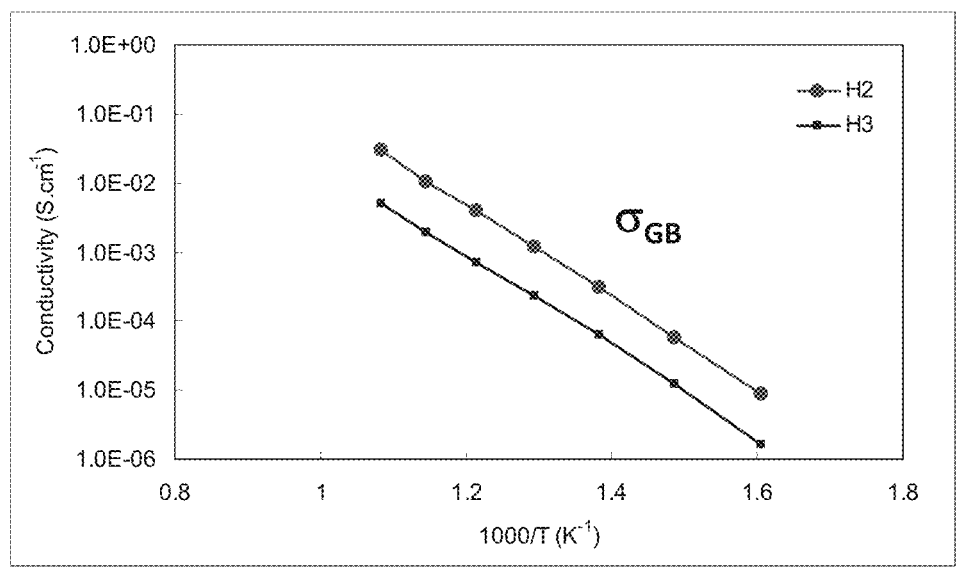
Figure 5F:
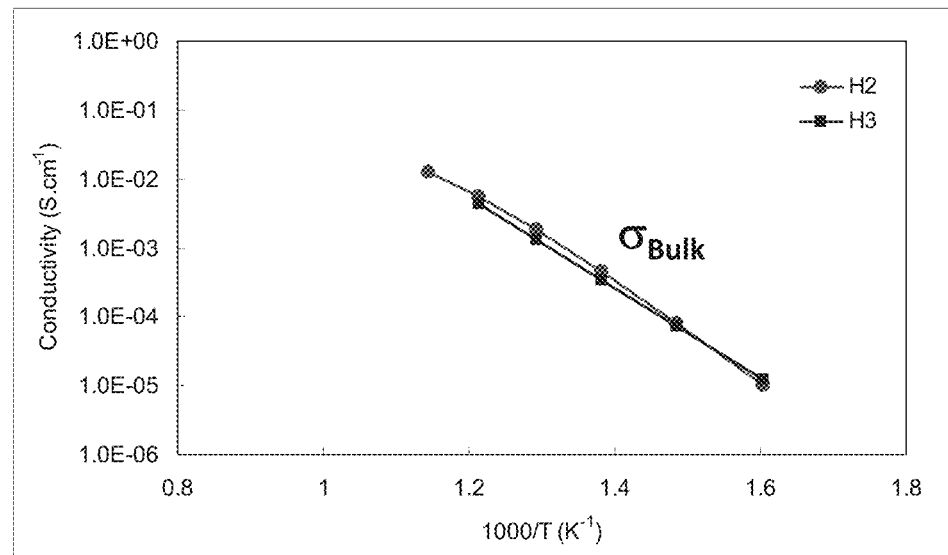
Figure 5G:
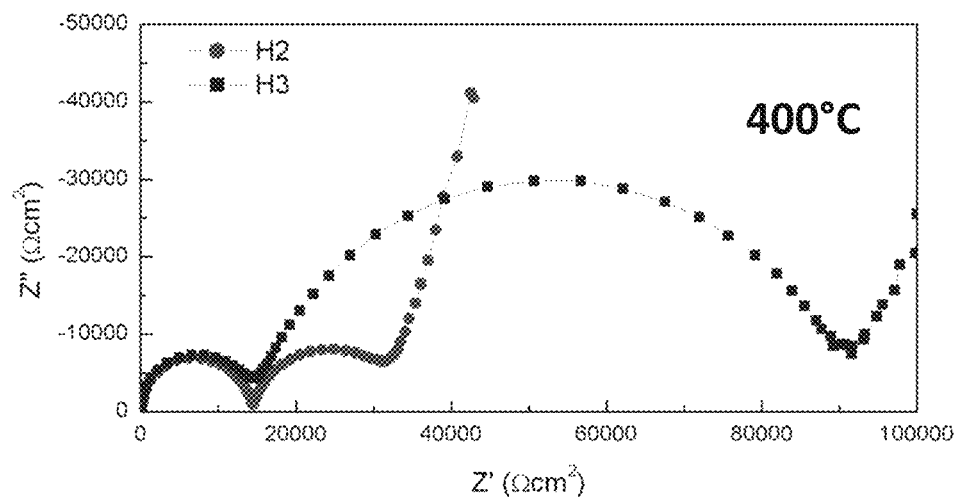

When the magnesium content of the H-series of compositions is increased from 5 at. % to 7.5 at. % or higher, a large decrease in conductivity may be observed. FIG. 5D illustrates EIS measurements showing total conductivity for H2 and H3 samples, which have 5 at. % and 7.5 at. % magnesium, respectively. FIG. 5E illustrates EIS measurements showing conductivity across the grain boundary for H2 and H3. FIG. 5F illustrates EIS measurements showing bulk conductivity for H2 and H3 samples, while FIG. 5G illustrates bulk resistivity measurements for the H2 and H3 samples. It may be observed from these measurements that H2 and H3 samples may have very similar bulk conductivities, while H3 may have a much lower grain boundary conductivity. Thus, 1-6 atomic percent MgO, such as 1.3-5 atomic percent are preferred.

Figure 6A:
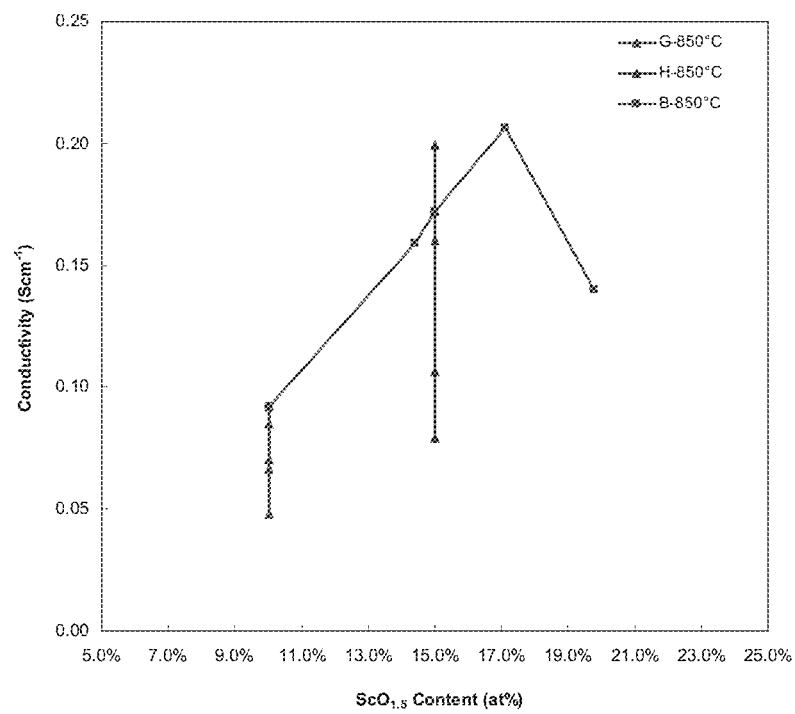
FIG. 6A is a graph showing D.C. conductivity versus atomic percent of scandium ions at 850° C. for embodiment series of magnesia doped scandia stabilized zirconia compositions.
Figure 6B:
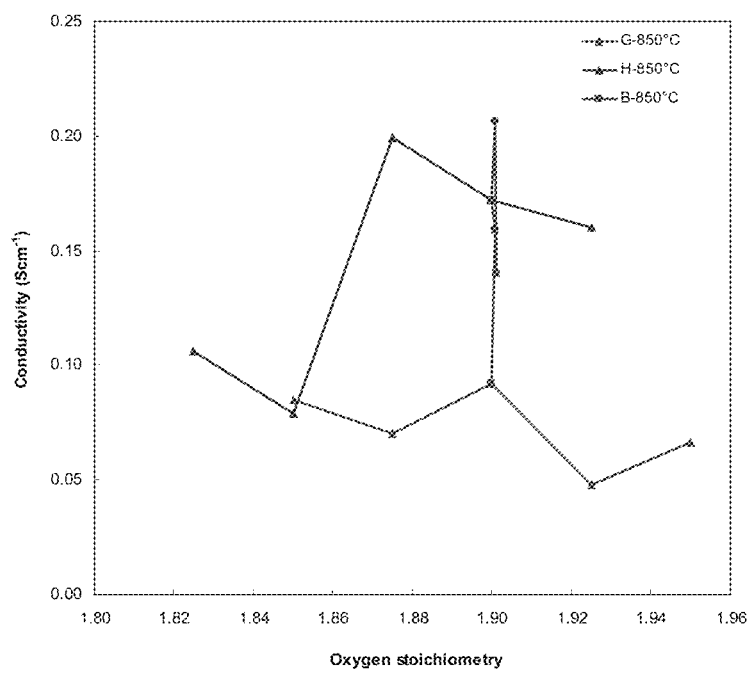
FIG. 6B is a graph showing D.C. conductivity versus oxygen stoichiometry at 850° C. for embodiment series of magnesia doped scandia stabilized zirconia compositions.
Figure 6C:
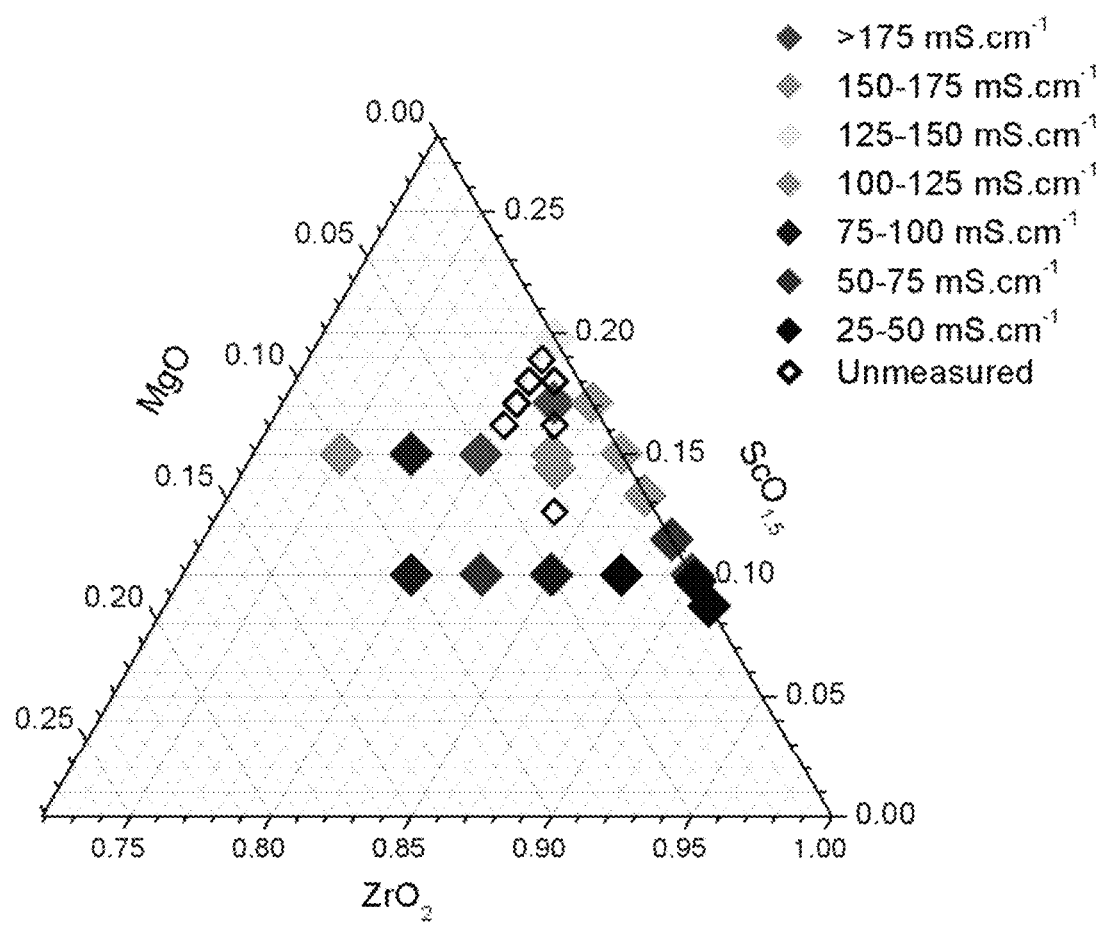
FIG. 6C is a ternary phase diagram showing D.C. conductivity results at 850° C. for embodiment series of magnesia doped scandia stabilized zirconia compositions.

FIG. 6A illustrates the variation of D.C. conductivity measurements with scandia content (measured as atomic percent of scandia) at 850° C. for the B, G and H-Series of compositions. FIG. 6B illustrates the variation of D.C. conductivity measurements with oxygen stoichiometry at 850° C. for the B, G and H-Series of compositions. FIG. 6C illustrates the D.C. conductivity results at 850° C. are presented on a ternary composition diagram. These plots indicate that peak values of conductivity may be achieved at scandia contents between 15 and 19 at. %, magnesia contents less than 5 at. % (e.g., 2-5 at. %), and oxygen stoichiometries between 1.875 and 1.9.

In order to further decrease the level of scandia, two additional series of compositions based on the B1.5 and B3 compositions may be developed.

In another embodiment, scandia stabilized zirconia compositions may be co-doped with magnesia and yttria. An example series of compositions ("E-series") may be prepared based on a parent composition of 10.7 mol % $Sc_2O_3$. The E-series may have a formula $Zr_{0.815}Sc_{0.171-x}Y_xMg_{0.0135}O_{1.90}$. In this series of compositions, one $Y^{3+}$ ion replaces one scandium ion, while zirconium, magnesium and oxygen levels remain constant. The x values that may be used to form the E-series compositions were: 0, 0.018, 0.036, 0.054, and 0.072, thereby creating the following E-series compositions:

E0: $Zr_{0.815}Sc_{0.171}Mg_{0.0135}O_{1.90}$. (Same as B1.5)
E1: $Zr_{0.815}Sc_{0.153}Y_{0.018}Mg_{0.0135}O_{1.90}$
E2: $Zr_{0.815}Sc_{0.135}Y_{0.036}Mg_{0.0135}O_{1.90}$
E3: $Zr_{0.815}Sc_{0.117}Y_{0.054}Mg_{0.0135}O_{1.90}$
E4: $Zr_{0.815}Sc_{0.099}Y_{0.072}Mg_{0.0135}O_{1.90}$ At x=0, no scandium ions are replaced, and the atomic percent of scandium is equal to the parent composition (i.e., 17.1%). At the highest x value, x=0.072, atomic percent of scandium is lowest of the series (i.e., 9.9%).

Figure 7A:
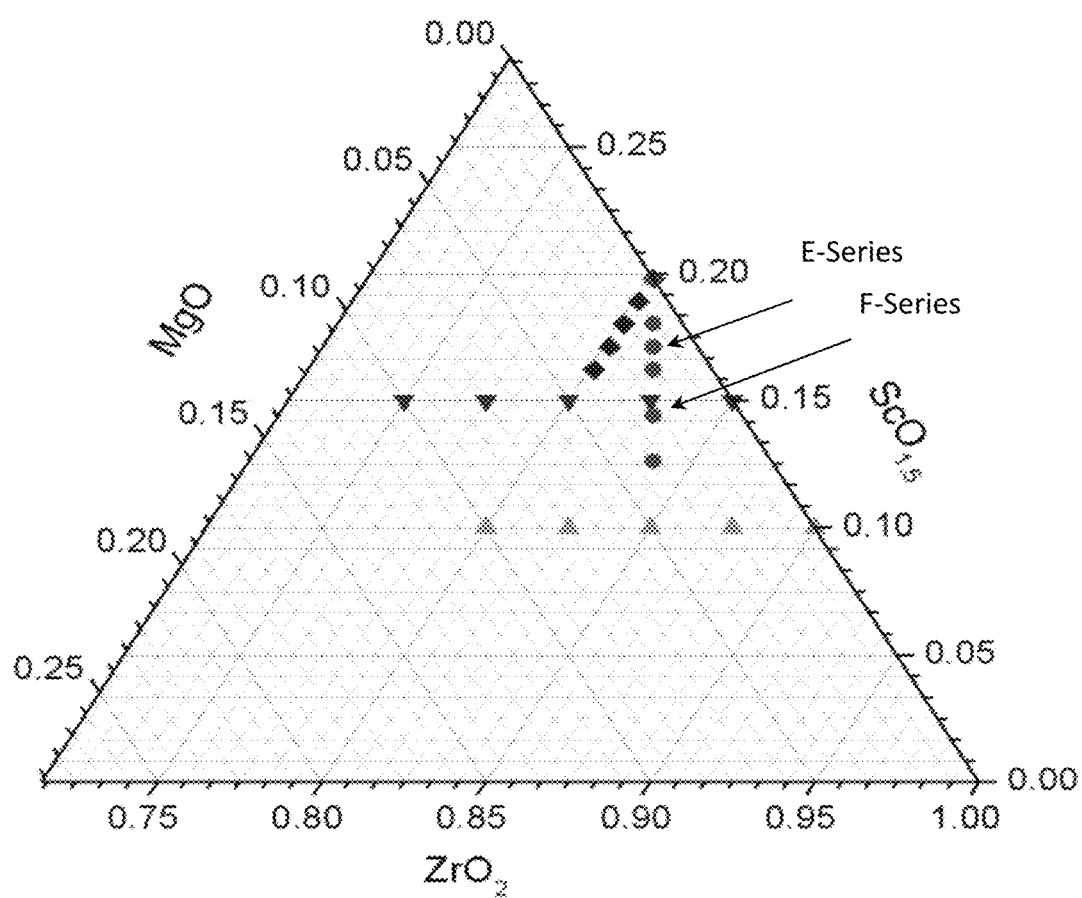
FIG. 7A is a ternary phase diagram of two embodiment series of yttria and magnesia doped scandia stabilized zirconia compositions.

Another example series of compositions ("F-series") may be prepared based on a parent composition of 7.9 mol % $Sc_2O_3$. The F-series may have a formula $Zr_{0.829}Sc_{0.144-x}Y_xMg_{0.027}O_{1.90}$. The x values that may be used to prepare the F-series compositions are: 0, 0.018, 0.036, 0.054, and 0.072, thereby creating the following compositions:

F0: $Zr_{0.829}Sc_{0.144}Mg_{0.027}O_{1.90}$ (Same as B3)
F1: $Zr_{0.829}Sc_{0.126}Y_{0.018}Mg_{0.027}O_{1.90}$
F2: $Zr_{0.829}Sc_{0.108}Y_{0.036}Mg_{0.027}O_{1.90}$
F3: $Zr_{0.829}Sc_{0.09}Y_{0.054}Mg_{0.027}O_{1.90}$
F4: $Zr_{0.829}Sc_{0.072}Y_{0.072}Mg_{0.027}O_{1.90}$ In this series of compositions, like in the E-series, one $Y^{3+}$ ion replaces one scandium ion, while zirconium, magnesium and oxygen levels remain constant. At x=0, no scandium ions are replaced, and the atomic percent of scandium is equal to the parent composition (i.e., 14.4%). At the highest x value, x=0.072, atomic percent of scandium is lowest of the series (i.e., 7.2%). A ternary phase diagram of the example E- and F-series compositions is illustrated in FIG. 7A (yttria not shown).

Figure 7B:
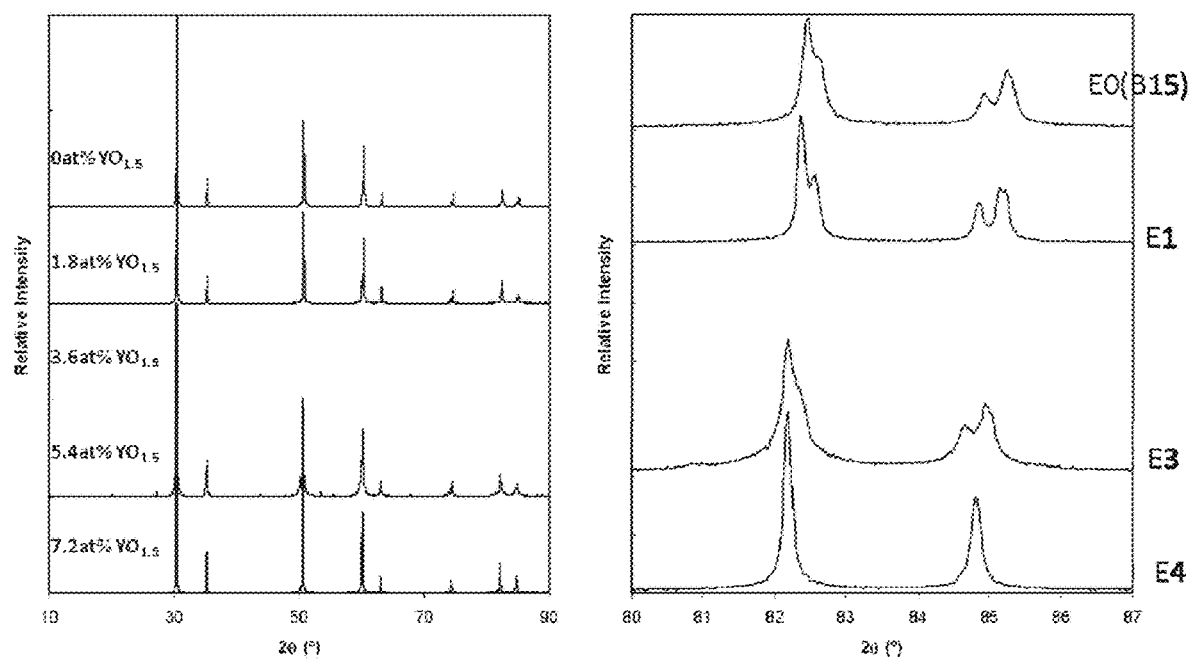
FIGS. 7B and 7C are plots showing x-ray diffraction patterns for compositions in two embodiment series of yttria and magnesia doped scandia stabilized zirconia compositions.
Figure 7C:
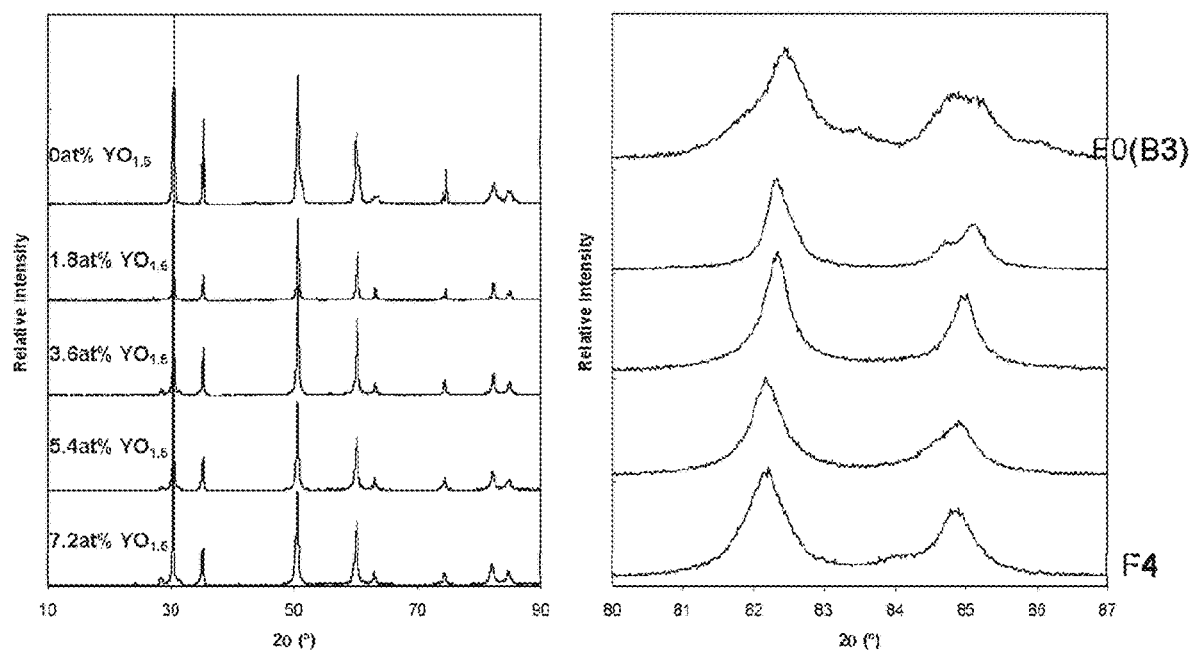

The XRD patterns of the example in the E-series and F-series compositions are shown in FIGS. 7B and 7C, respectively. The E-series of compositions may be tetragonal at yttrium contents of 5.4 at. % or less and may be cubic at 7.2 at. %. The F-series compositions may remain tetragonal. At 5.4 at. % and 7.2 at. % yttrium, the F-series samples may also have small amounts of monoclinic phase. Table 2 shows the room temperature phases of example compositions E0 through E4, and F0 through F4.

| Composition | Phases Present | Spacegroup |
|---|---|---|
| E0 (B1-5) | Tetragonal | P42 nmc |
| E1 | Tetragonal | P42 nmc |
| E2 | Tetragonal | P42 nmc |
| E3 | Tetragonal | P42 nmc |
| E4 | Cubic | Fm3m |
| F0 | Tetragonal | P42 nmc |
| F1 | Tetragonal | |
| F2 | Tetragonal | P42 nmc |
| F3 | Tetragonal + monoclinic | P42 nmc |
| F4 | Tetragonal + monoclinic | P42 nmc |

Figure 8A:
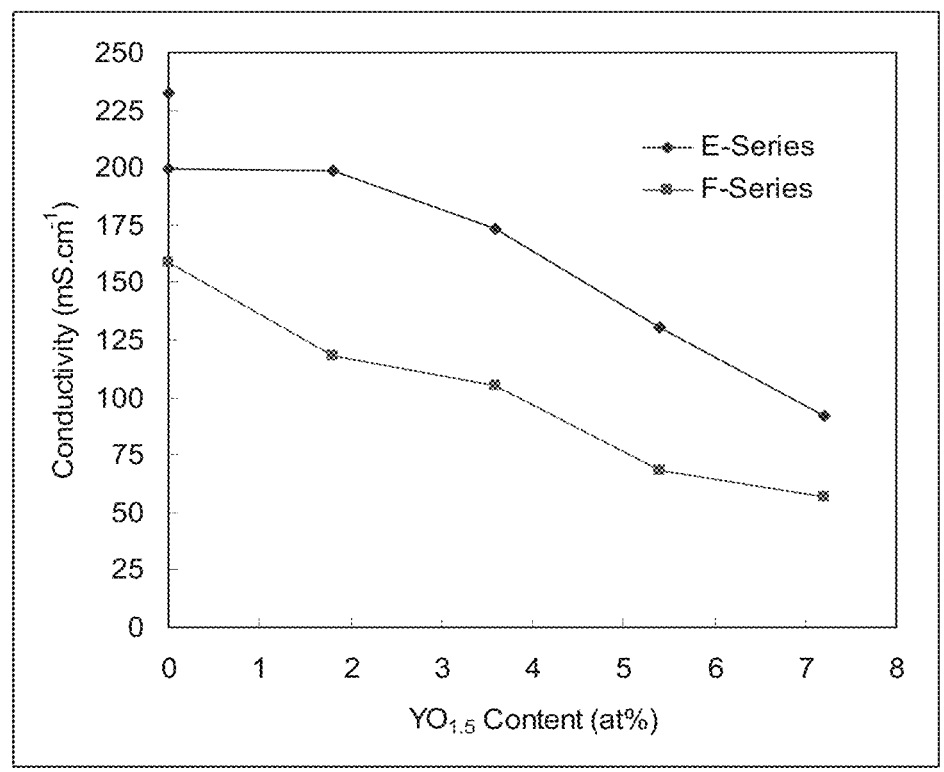
FIG. 8A is a graph showing D.C. conductivity versus atomic percentage of yttrium ions at 850° C. for two embodiment series of yttria and magnesia doped scandia stabilized zirconia compositions.

FIG. 8A illustrates the variation in D.C. conductivity with yttria content measured for the E and F series of compositions at 850° C. As the data show, an approximately linear decrease in conductivity may occur with increasing content. The highest conductivity for a yttria-containing sample may be 199 mS/cm for E1, which has 1.8 at. % yttrium.

Figure 8B:
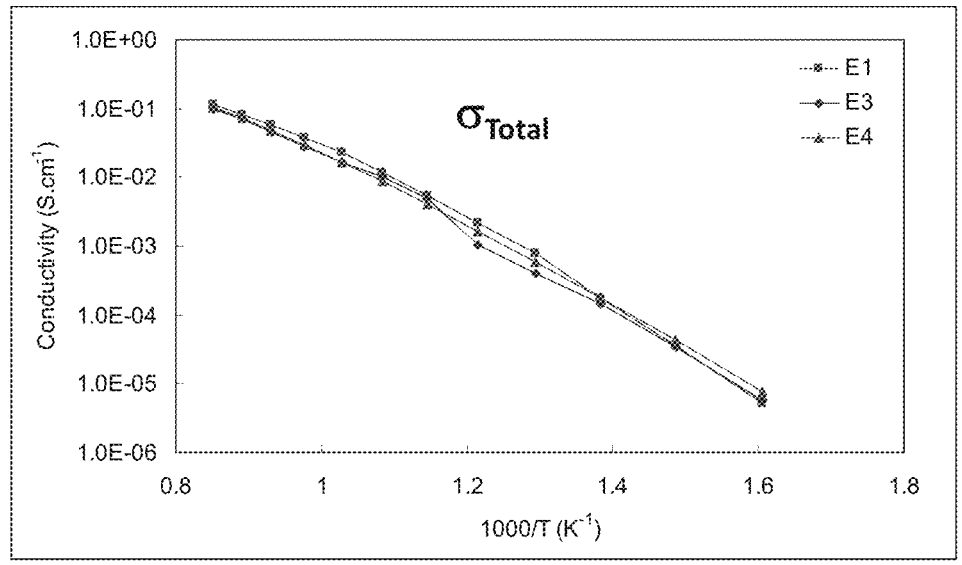
FIGS. 8B-8E are graphs showing electrical impedance spectroscopy results for sample compositions in an embodiment series of yttria and magnesia doped scandia stabilized zirconia compositions.
Figure 8C:
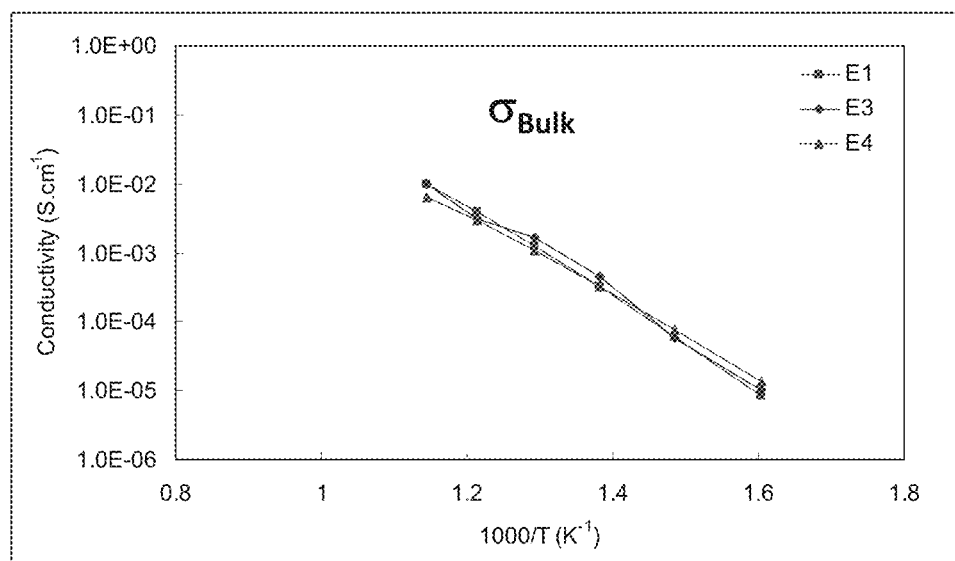
Figure 8D:
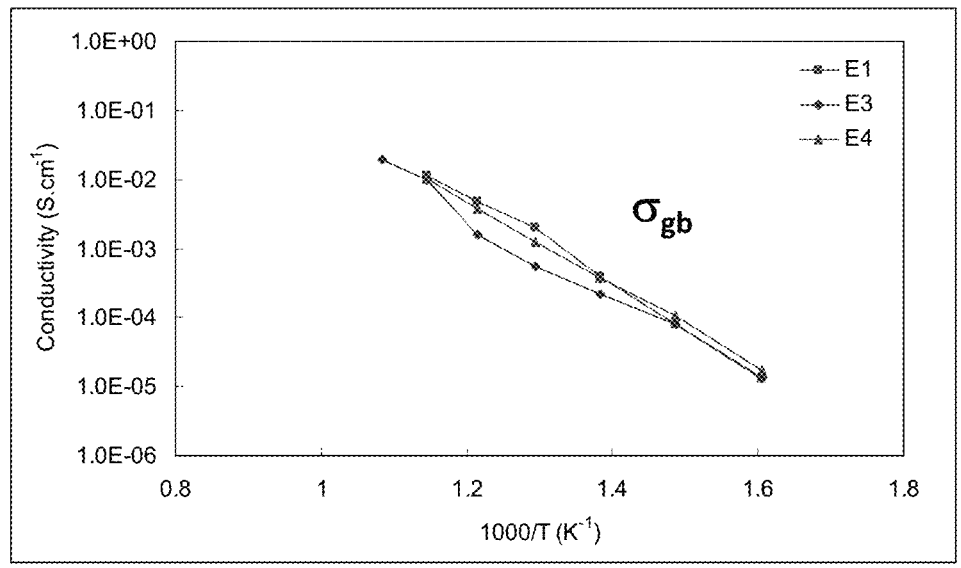
Figure 8E:
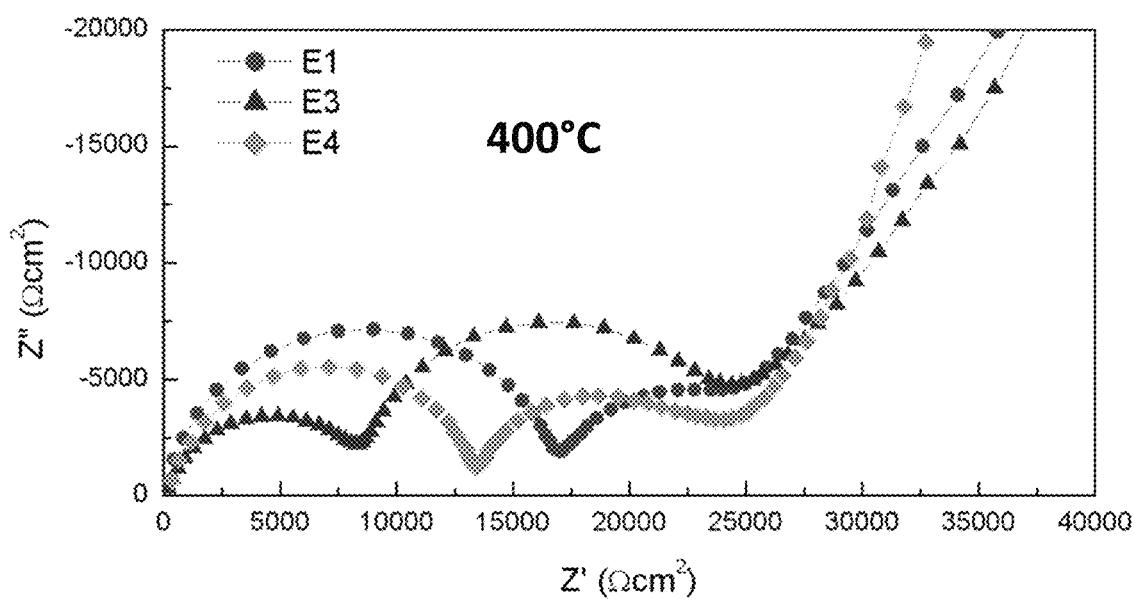

FIG. 8B illustrates EIS measurements showing total conductivity for the E-series compositions E1, E3 and E4. FIG. 8C illustrates EIS measurements showing bulk conductivity for E1, E3 and E4. FIG. 8D illustrates EIS measurements showing conductivity across the grain boundary plane for E1, E3 and E4. FIG. 8E illustrates bulk resistivity values at 400° C. for E1, E3 and E4.

Figure 9A:
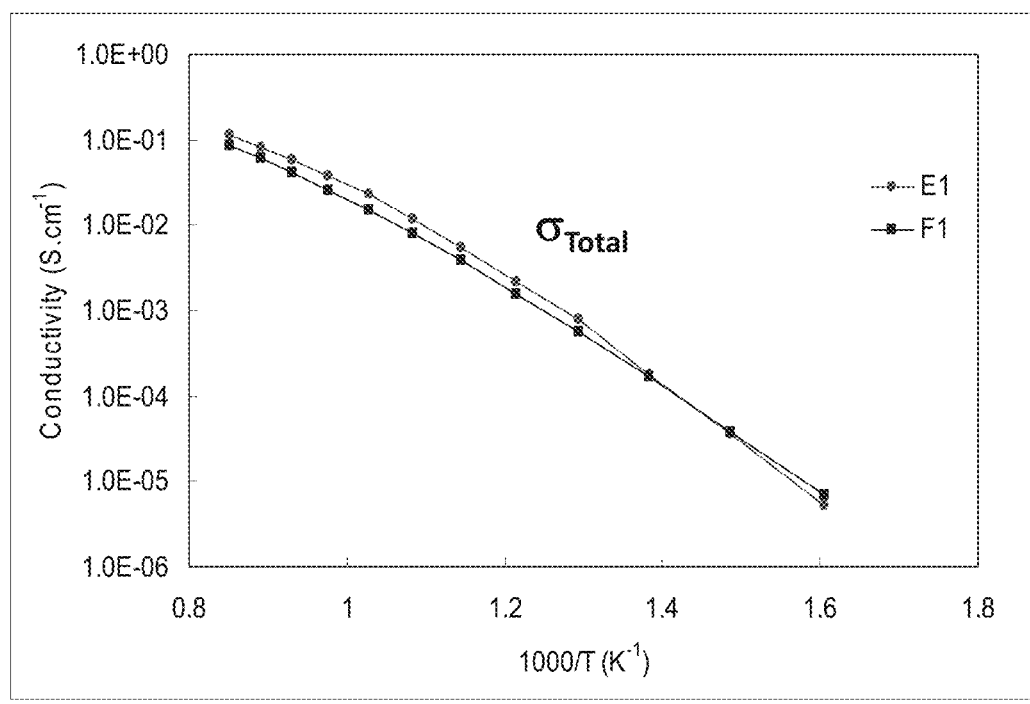
FIGS. 9A-9D are graphs showing electrical impedance spectroscopy results for sample compositions in two embodiment series of yttria and magnesia doped scandia stabilized zirconia compositions.
Figure 9B:
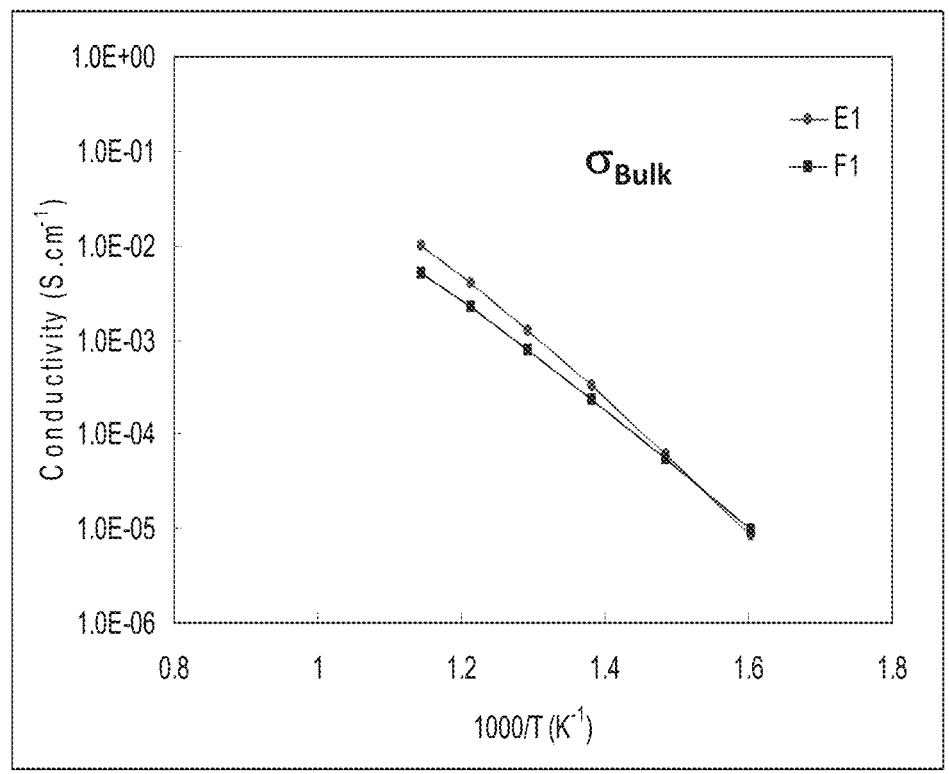
Figure 9C:
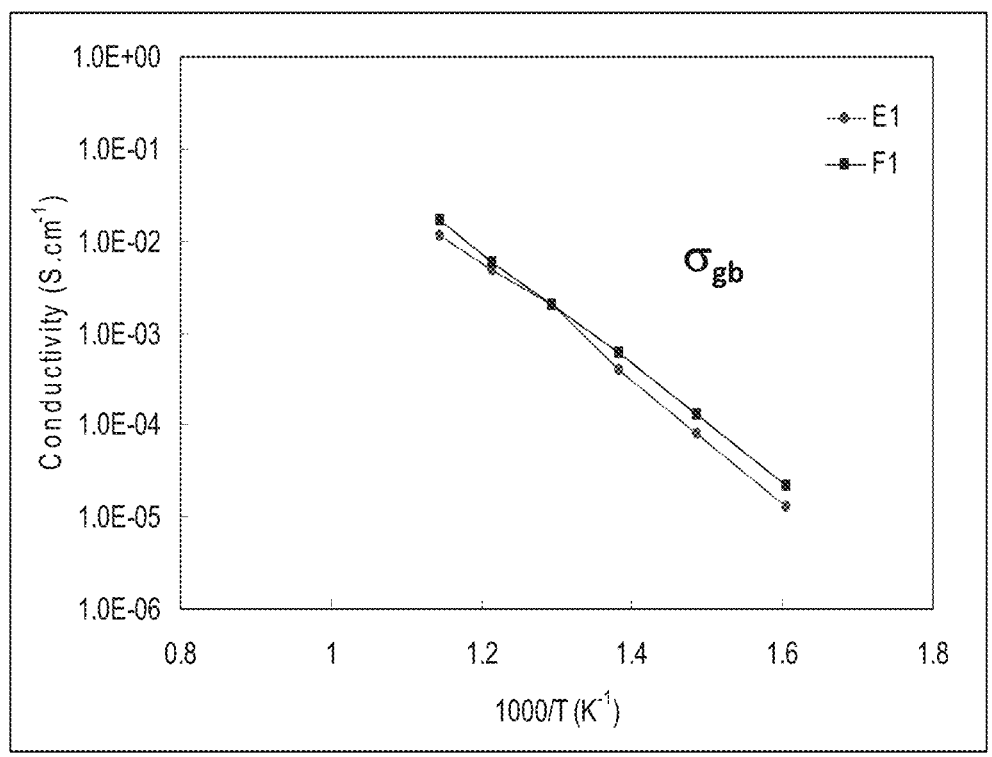
Figure 9D:
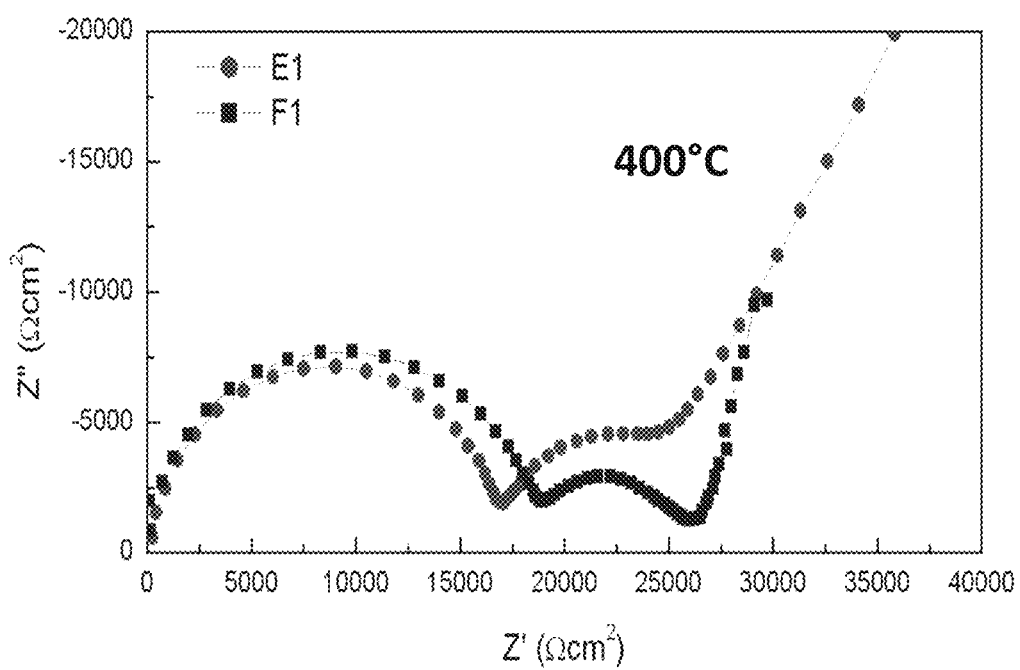

FIG. 9A illustrates EIS measurements showing total conductivity for the samples E1 and F1, each of which have 1.8 at. % yttrium. FIG. 9B illustrates EIS measurements showing bulk conductivity for E1 and F1. FIG. 9C illustrates EIS measurements showing conductivity across the grain boundary plane for E and F1. FIG. 9D illustrates bulk resistivity values at 400° C. for E1 and F1.

Figure 10A:
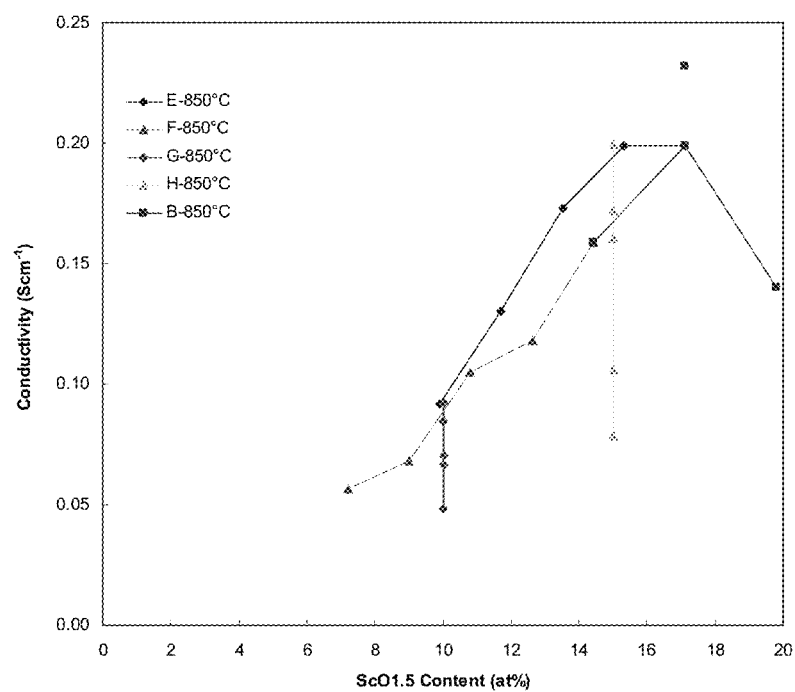
FIG. 10A is a graph showing D.C. conductivity versus atomic percentage of scandium ions at 850° C. for embodiment series of magnesia doped scandia stabilized zirconia compositions and yttria and magnesia doped scandia stabilized zirconia compositions.
Figure 10B:
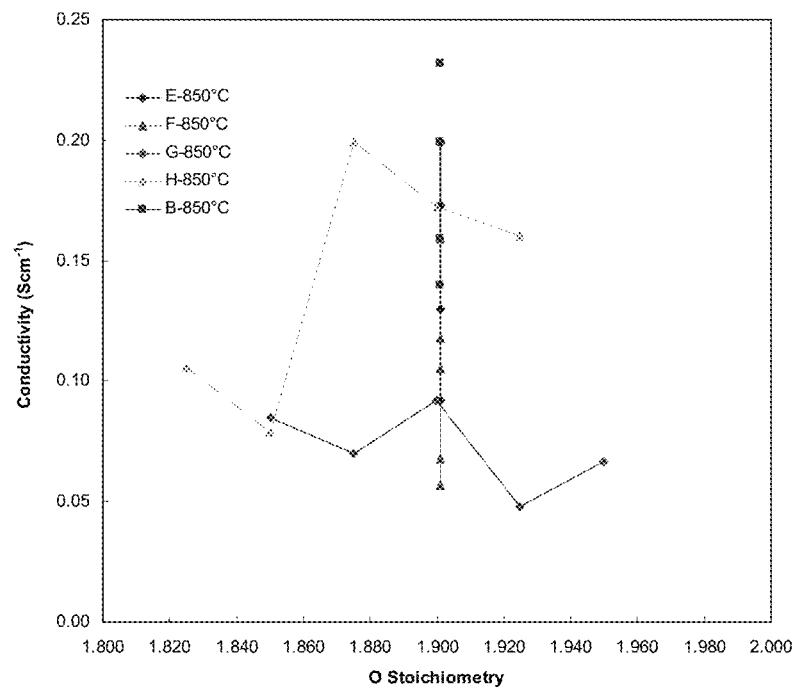
FIG. 10B is a graph showing D.C. conductivity versus oxygen stoichiometry at 850° C. for embodiment series of magnesia doped scandia stabilized zirconia compositions and yttria and magnesia doped scandia stabilized zirconia compositions.

FIG. 10A illustrates D.C. conductivity at 850° C. versus scandia content for series A, B, G and H ($ZrO_2$—$Sc_2O_3$—MgO), and E and F ($ZrO_2$—$Sc_2O_3$—$Y_2O_3$—MgO) at 850° C. Further, FIG. 10 B illustrates D.C. conductivity at 850° C. versus oxygen stoichiometry for each of these series. The conditions for high conductivity in the yttria containing samples are consistent with those found for the yttria free samples. The highest values of conductivity may be found for scandium contents between 15 and 19 at. % magnesium contents less than 5 at. % and oxygen stoichiometries between 1.875 and 1.9.

In another embodiment, scandia stabilized zirconia compositions that are similar to the B-series compositions may be doped with either zinc oxide (ZnO) or indium oxide ($In_2O_3$), instead of or in addition to magnesia.

In an example series of compositions ("B—Zn series"), which may be based on the B1.5 sample composition discussed above, zinc ions may replace magnesium ions. The B—Zn series may have a formula of $Zr_{0.802+x}Sc_{0.198-2x}Zn_xO_{1.90}$. X values that may be used to prepare this B—Zn series of compositions are: 0, 0.0135 (corresponding to B1.5) and 0.027 (corresponding to B3), thereby creating the following compositions:

B1.5Zn: $Zr_{0.815}Sc_{0.171}Zn_{0.0135}O_{1.90}$
B3Zn: $Zr_{0.829}Sc_{0.144}Zn_{0.0270}O_{1.90}$

Figure 11A:
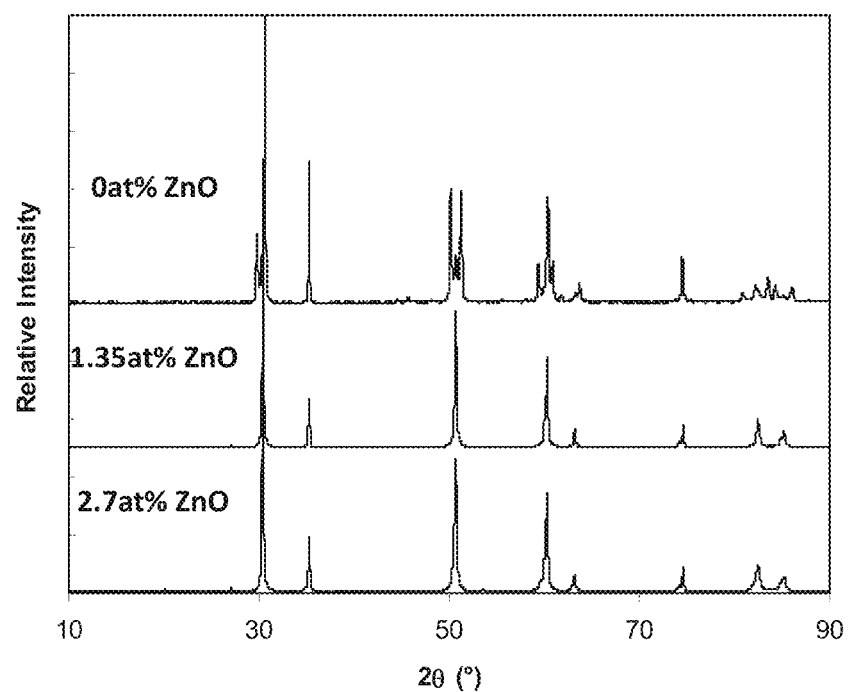
FIG. 11A is a plot showing x-ray diffraction patterns for sample compositions in an embodiment series of zinc oxide doped scandia stabilized zirconia compositions.
Figure 11B:
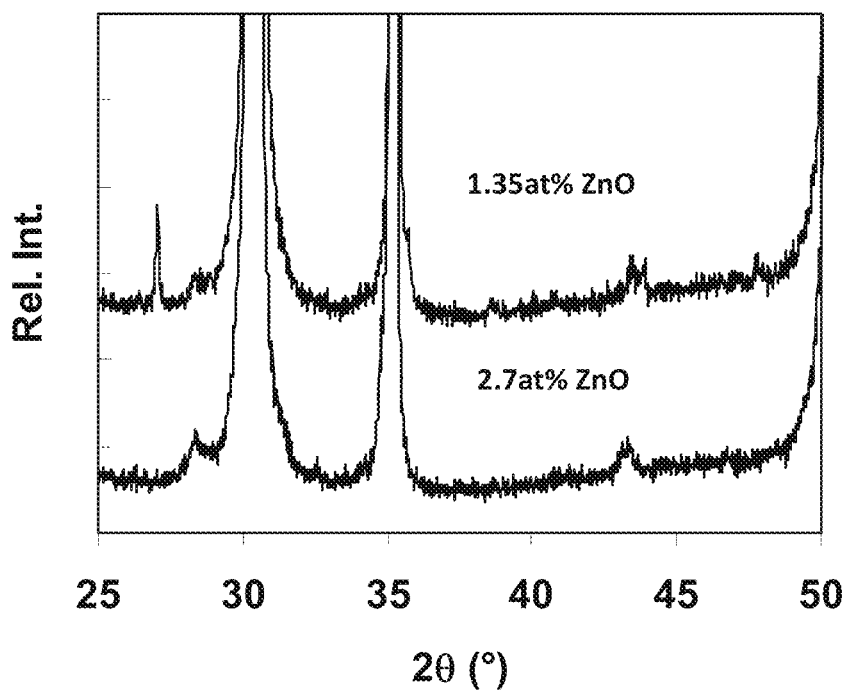
FIG. 11B is an expanded view of the x-ray diffraction patterns of FIG. 11A for angles within the range of $2\theta=25-50$.
Figure 11C:
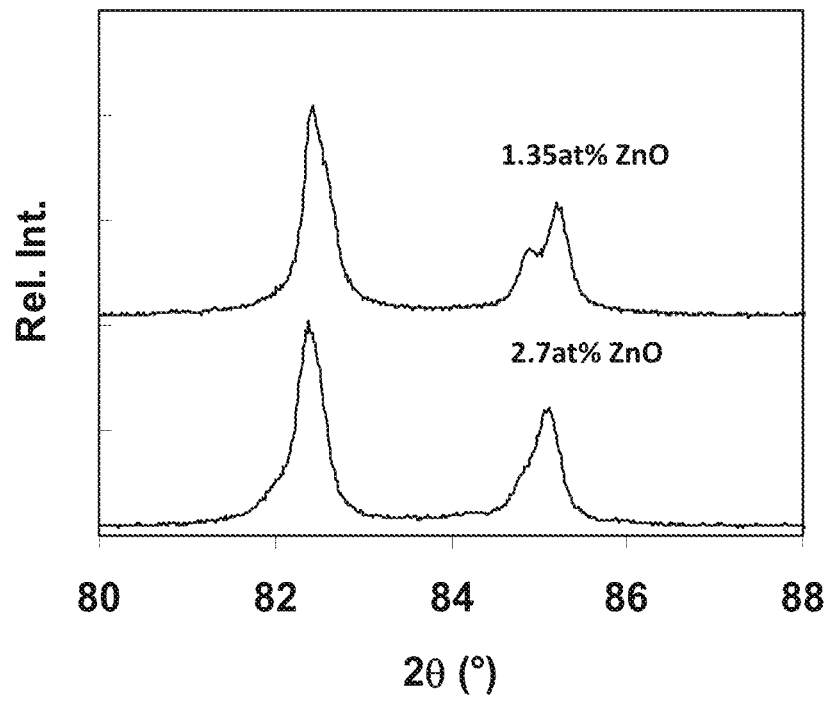
FIG. 11C is an expanded view of the x-ray diffraction patterns of FIG. 11A for angles within the range of $2\theta=80-88$.

Specifically, in this series, two $Sc^{3+}$ ions may be replaced by one $Zn^{2+}$ and one $Zr^{4+}$ ion. The oxygen stoichiometry remains constant as $Sc^{3+}$ is replaced by these ions. XRD patterns for sample compositions in this B—Zn series of compositions are illustrated in FIGS. 11A-11C, where FIGS. 11B and 11C are close ups of low and high angle regions of FIG. 11A.

The conductivities at 850° C. of the B—Zn series compositions, compared to corresponding B-series compositions and the parent composition with 11 mol % $Sc_2O_3$, are provided in Table 3 below:

| | $\sigma_{850° C}$ (mS · cm$^{-1}$) | |
|---|---|---|
| | B—Zn series | B-series |
| 11$Sc_2O_3$ | 140 | 140 |
| B1.5 | 127 | 199, 232 |
| B3 | 105 | 159 |

Figure 12A:
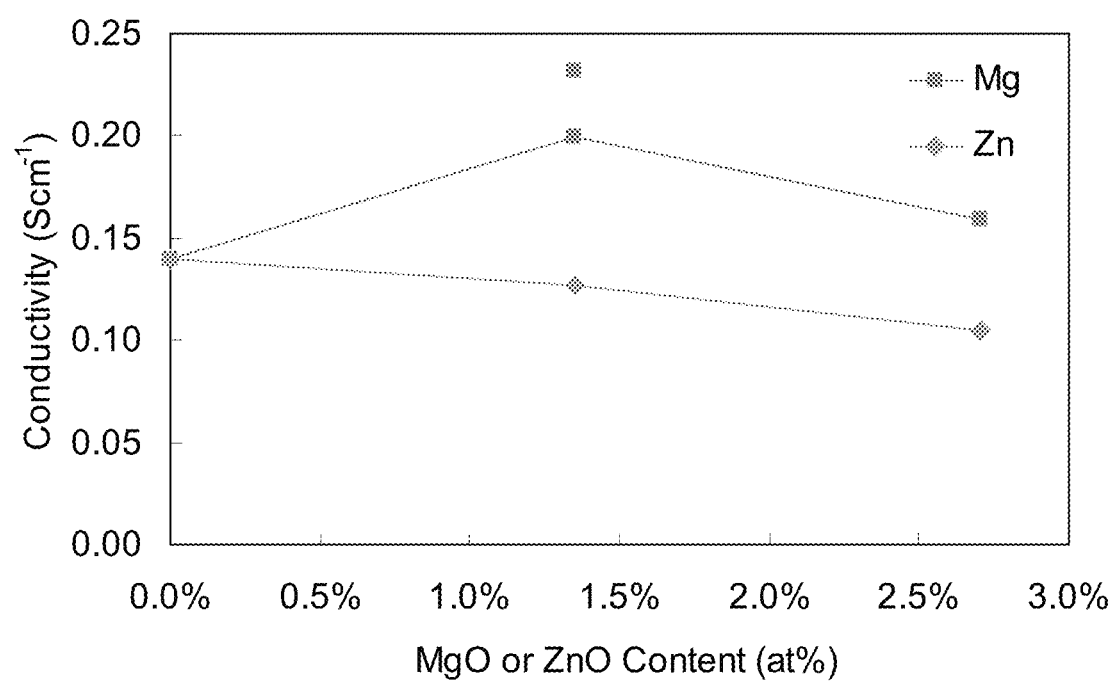
FIG. 12A is a graph comparing D.C. conductivities at 850° C. of an embodiment series of magnesia doped scandia stabilized zirconia compositions and a similar series of zinc oxide doped scandia stabilized zirconia compositions.

FIG. 12A illustrates D.C. conductivity at 850° C. versus ZnO content (measured as atomic percent of zinc) for the B—Zn series of compositions, overlaid onto a plot of D.C. conductivity at 850° C. versus magnesium content for B1.5 and B3.

In another example series of compositions, indium oxide may be used as a co-dopant with scandia. Similar to the A-series of compositions in which $Mg^{2+}$ is a co-dopant that replaces $Sc^{3+}$, in an $In_2O_3$ co-doped composition the $In^{3+}$ ions may replace $Sc^{3+}$ ions in a 1:1 ratio, with the oxygen content remaining fixed. This series may be based on a parent composition of 11 mol % $Sc_2O_3$, and may have a formula of: $Zr_{0.802}Sc_{0.198-x}In_xO_{1.90}$ where 0≤x≤0.198, such as 0.018≤x≤0.18.

Sample compositions of this embodiment may have 0-11 mol % $Sc_2O_3$, such as 1-9 mol % $Sc_2O_3$, and 0-11 mol % $In_2O_3$, such as 2-10 mol % $In_2O_3$, with a total doping range (i.e., sum of $Sc_2O_3$ and $In_2O_3$ mole percentages) of 11 mol %. In one example, the composition may have 9 mol % $Sc_2O_3$ and 2 mol % $In_2O_3$, and therefore have a formula of $Zr_{0.802}Sc_{0.162}In_{0.036}O_{1.90}$.

Figure 12B:
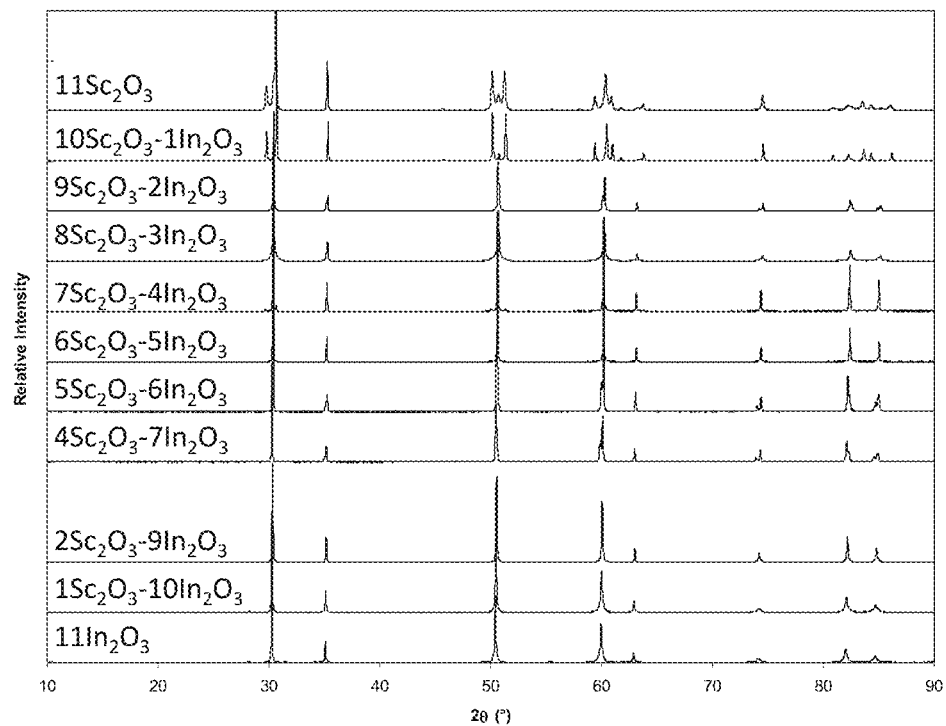
FIG. 12B is a plot showing x-ray diffraction patterns for an embodiment series of indium oxide doped scandia stabilized zirconia compositions.
Figure 12C:
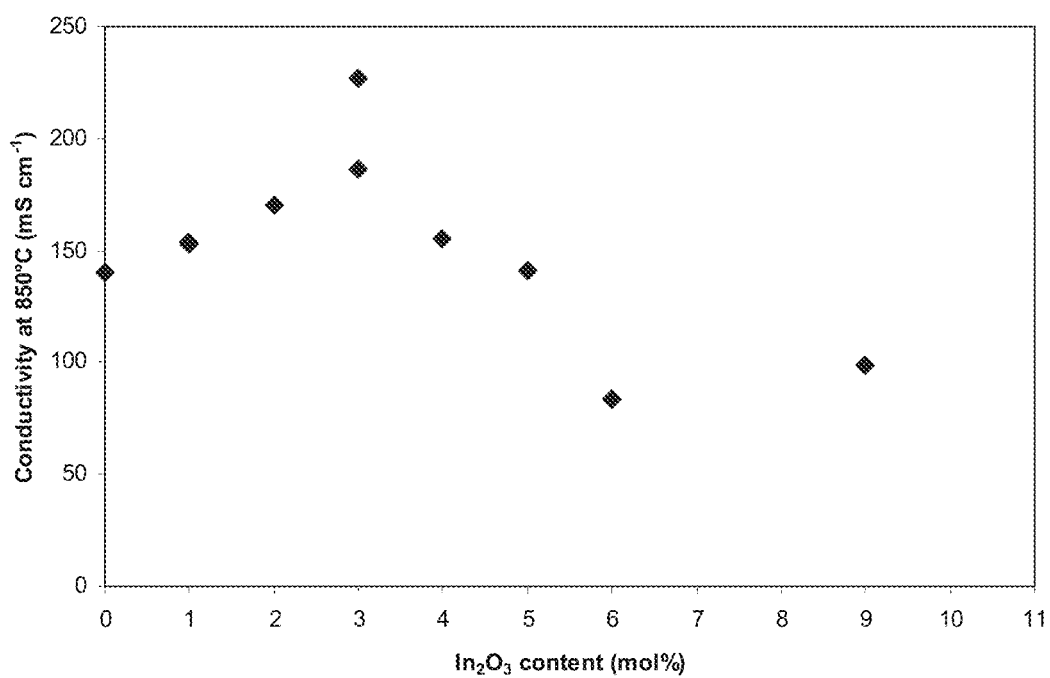
FIG. 12C is a graph showing D.C. conductivity versus mole percent of indium oxide at 850° C. for an embodiment series of indium oxide doped scandia stabilized zirconia compositions.

FIG. 12B illustrates XRD patterns for this series, in which sample compositions have discreet integer indium oxide contents varying from 0 to 11 mol % and discreet integer scandia contents varying from 11 to 0 mol %. FIG. 12C illustrates the variation in D.C. conductivity of these sample compositions as a function of discrete integer indium oxide content (measured as mole percent of $In_2O_3$), where indium oxide content varies from 0 to 11 mol %. As shown by the data plot, D.C. conductivity of the samples may be a value between 80 mS/cm and 220 mS/cm. As also shown by the data plot, a peak D.C. conductivity level of at least 215 mS/cm, such as between 215 and 220 mS/cm, may be achieved at about 3 mol % $In_2O_3$, which corresponds to a sample formula of around $Zr_{0.802}Sc_{0.144}In_{0.054}O_{1.90}$. Thus, this series may be described as having a formula $Zr_{1-w-y}Sc_wIn_yO_d$, in which $0.018 \leq w \leq 0.18$, in which $0.018 \leq y \leq 0.18$, and in which $1.8 \leq d \leq 2$. In an embodiment, scandium ion concentration (w) may be characterized by $w = 0.198 - y$. In another embodiment, indium ion concentration (y) may be characterized by $y = 0.054$.

In another embodiment, scandia stabilized zirconia compositions that are similar to the H-series compositions may be doped with indium oxide ($In_2O_3$) in addition to magnesia. In an example series of compositions ("H—In series"), which may be based on the H2 sample composition discussed above, $Sc^{3+}$ ions may be replaced by $Mg^{2+}$ ions in a 1:1 ratio, thereby lowering scandium and oxygen content of the composition while keeping zirconia and indium content constant. The H—In series may have a formula of $Zr_{0.8}Sc_{0.15-x}In_{0.05}Mg_xO_{2-d}$, in which $0 \leq x \leq 0.05$. The formula for the H—In series may also be written as $Zr_{0.8}Sc_{0.15-x}In_{0.05}Mg_xO_d$, in which $1.8 \leq d \leq 2$ and $0 \leq x \leq 0.05$. At $x = 0$, no magnesia is present and a sample composition has a formula $Zr_{0.8}Sc_{0.10}In_{0.05}O_{2-d}$. At $x = 0.05$, a sample composition has a formula $Zr_{0.8}Sc_{0.10}In_{0.05}Mg_{0.05}O_{2-d}$.

Another set of examples involves variants of the E1 sample composition, discussed above. In one example composition, zinc oxide may replace magnesia as a dopant, producing a composition "E1-Zn" that may have a formula $Zr_{0.815}Sc_{0.153}Y_{0.018}Zn_{0.0135}O_{1.90}$. In another example, $In_2O_3$ may be used as a co-dopant that replaces yttria, producing a composition "E1-In" that may have a formula $Zr_{0.815}Sc_{0.153}In_{0.018}Mg_{0.0135}O_{1.90}$.

Figure 13A:
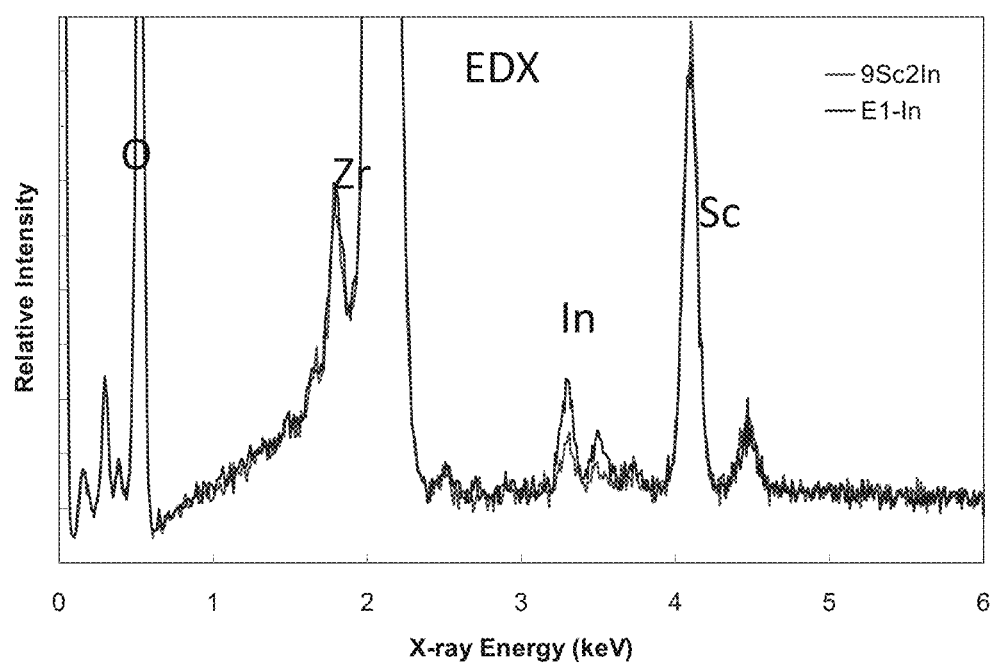
FIG. 13A is plot showing electron diffraction spectroscopy patterns for an embodiment series of indium oxide and magnesia doped scandia stabilized zirconia compositions and an embodiment series of indium oxide doped scandia stabilized zirconia compositions.
Figure 13B:
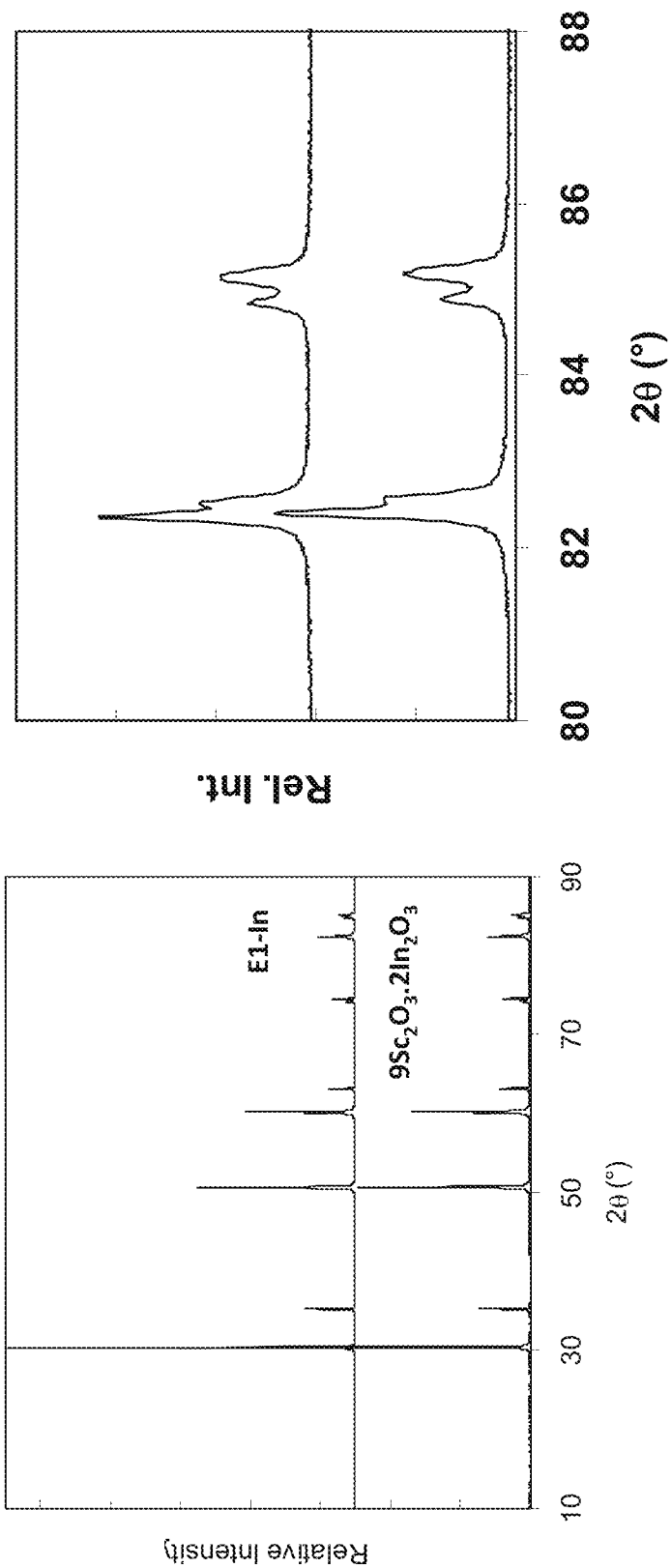
FIG. 13B is a plot showing x-ray diffraction patterns for sample compositions in embodiment series of scandia stabilized zirconia compositions doped with varying amounts of indium oxide and magnesia.

FIG. 13A illustrates energy-dispersive x-ray (EDX) spectroscopy analysis of the sample compositions E1-In and $9Sc_2O_3-2In_2O_3$. FIG. 13B illustrates x-ray diffraction (XRD) patterns for these compositions, with an expanded view region for angles of $2\theta = 80-88°$. At 850° C., the D.C. conductivity of E1-In at 850° C. may be around 195 mS/cm, while the D.C. conductivity of $9Sc_2O_3-2In_2O_3$ may be around 170 mS/cm. Thus, these compositions have a conductivity of at least 170, such as 180-195 mS/cm.

Figure 14A:
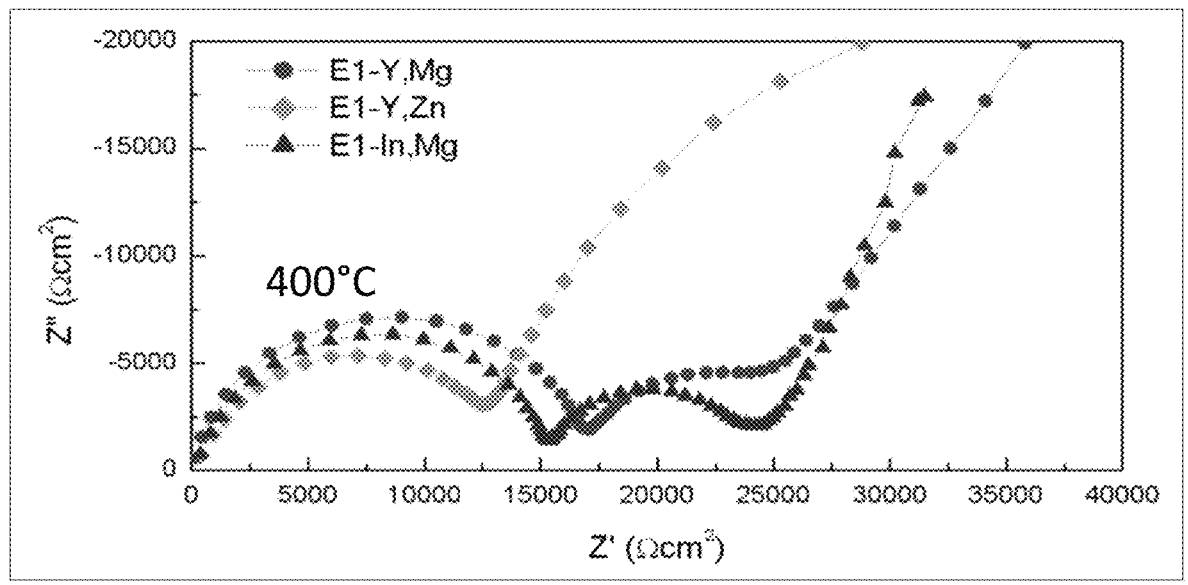
FIGS. 14A-14D are graphs showing electrical impedance spectroscopy results for sample compositions in embodiment series of scandia stabilized zirconia compositions doped with varying amounts of yttria, magnesia, indium oxide, and/or zinc oxide.
Figure 14B:
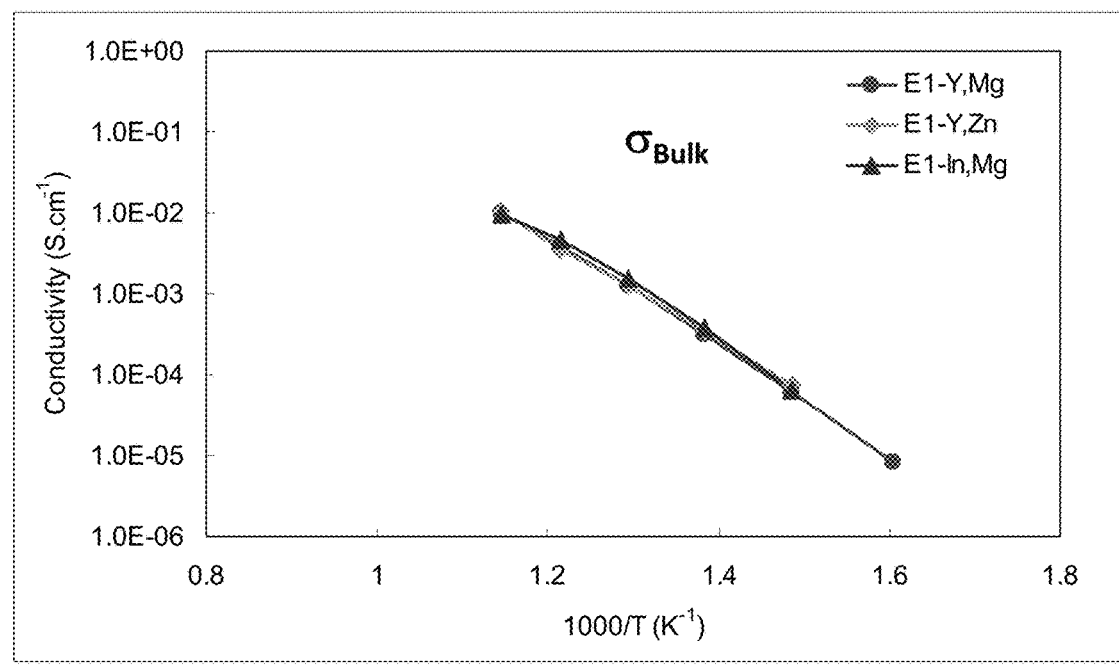
Figure 14C:
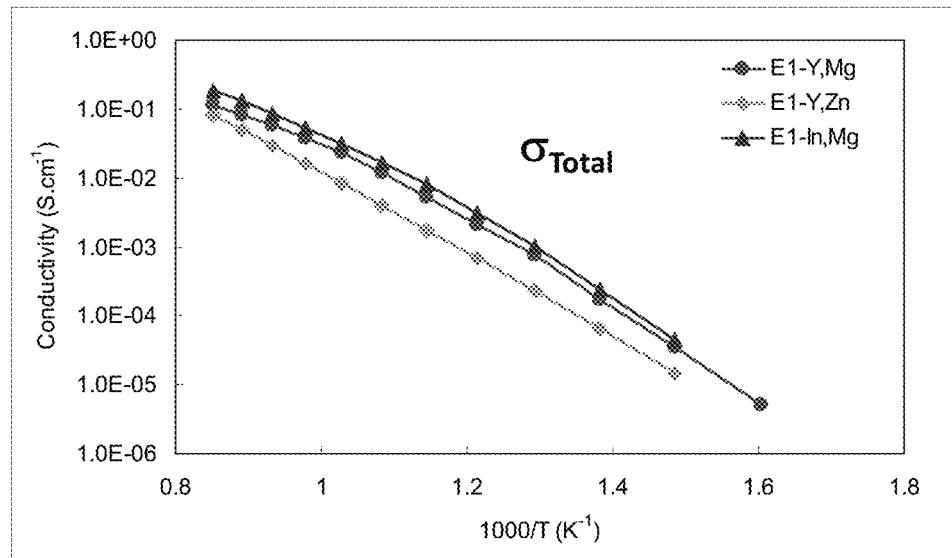
Figure 14D:
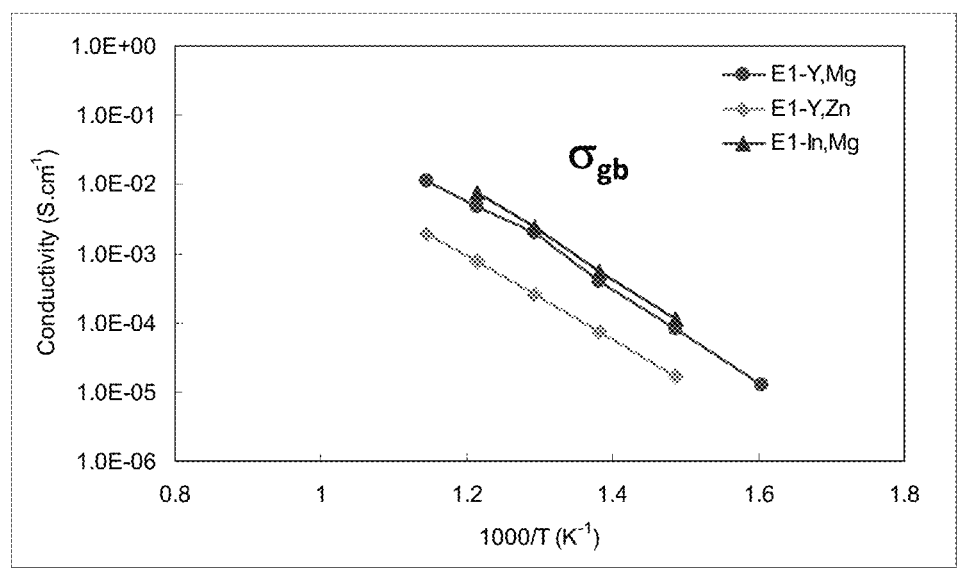

FIG. 14A shows bulk impedance values of the E1 sample composition with the E1 variants E1-Zn and E1-In at 400° C. FIG. 14B shows bulk conductivity measurements for E1, E1-Zn and E1-In. FIG. 14C shows the total conductivity measurements for E1, E1-Zn and E1-In, and FIG. 14D shows the conductivity across the grain boundary plane for E1, E1-Zn and E1-In.

In further embodiments, scandia stabilized zirconia may be co-doped with gallium oxide and yttria. Without wishing to be bound to a particular theory, the combination of the smaller radius $Ga^{3+}$ ion and the larger radius $Y^{3+}$ may lead to less distortion of the crystal structure.

An example series of compositions ("I-series") may be created with a formula $Zr_{0.8018}Sc_{0.1782}Y_{0.02-x}Ga_xO_{1.90}$. In this series of compositions, one $Ga^{3+}$ ion replaces one $Y^{3+}$ ion, while zirconium, scandium and oxygen levels remain constant. The x values that may be used to form the I-series compositions are: 0, 0.005, 0.01, 0.015 and 0.02, thereby creating the following compositions:

I0: $Zr_{0.802}Sc_{0.178}Y_{0.02}O_{1.90}$
I1: $Zr_{0.802}Sc_{0.171}Y_{0.015}Ga_{0.005}O_{1.90}$
I2: $Zr_{0.802}Sc_{0.171}Y_{0.01}Ga_{0.01}O_{1.90}$
I3: $Zr_{0.802}Sc_{0.171}Y_{0.005}Ga_{0.015}O_{1.90}$
I4: $Zr_{0.802}Sc_{0.171}Ga_{0.02}O_{1.90}$

At $x = 0$, no yttrium ions are replaced, and no gallium ions are present. At the highest x value, $x = 0.02$, all yttrium ions are replaced by gallium ions.

Another example series of compositions ("J-series") may be prepared with a formula $Zr_{0.802}Sc_{0.188}Y_{0.01-x}Ga_xO_{1.90}$. In the J-series, one $Ga^{3+}$ ion replaces one $Y^{3+}$ ion, while zirconium, scandium and oxygen levels remain constant. The x values that may be used to form the J-series compositions are: 0, 0.0025, 0.005, 0.0075, thereby creating the following compositions:

J0: $Zr_{0.802}Sc_{0.188}Y_{0.01}O_{1.90}$
J1: $Zr_{0.802}Sc_{0.188}Y_{0.0075}Ga_{0.0025}O_{1.90}$
J2: $Zr_{0.802}Sc_{0.188}Y_{0.005}Ga_{0.005}O_{1.90}$
J3: $Zr_{0.802}Sc_{0.188}Y_{0.0025}Ga_{0.0075}O_{1.90}$

At $x = 0$, no yttrium ions are replaced, and no gallium ions are present. At the highest x value, $x = 0.0075$, the composition contains 2.5 at. % $Y^{3+}$ and 7.5 at. % $Ga^{3+}$ ions.

Another example series of compositions ("K-series") may be prepared with a formula $Zr_{0.8018}Sc_{0.1682}Y_{0.03-x}Ga_xO_{1.90}$. In this series of compositions, one $Ga^{3+}$ ion replaces one $Y^{3+}$ ion, while zirconium, scandium and oxygen levels remain constant. An x value that may be used to form an example K-series composition is 0.015, which may create a K2 sample composition having a formula $Zr_{0.8018}Sc_{0.1682}Y_{0.015}Ga_{0.015}O_{1.90}$. At this x value, the atomic percentages of $Y^{3+}$ ions and $Ga^{3+}$ ions are equal.

Another example series of compositions ("L-series") may be prepared with a formula $Zr_{0.8018}Sc_{0.1582}Y_{0.04-x}Ga_xO_{1.90}$. In this series of compositions, one $Ga^{3+}$ ion replaces one $Y^{3+}$ ion, while zirconium, scandium and oxygen levels remain constant. An x value that may be used to form an example L-series composition is 0.02, which may create a L2 sample composition having a formula $Zr_{0.8018}Sc_{0.1582}Y_{0.02}Ga_{0.02}O_{1.90}$. At this x value, the atomic percentages of $Y^{3+}$ ions and $Ga^{3+}$ ions are equal.

Figure 15:
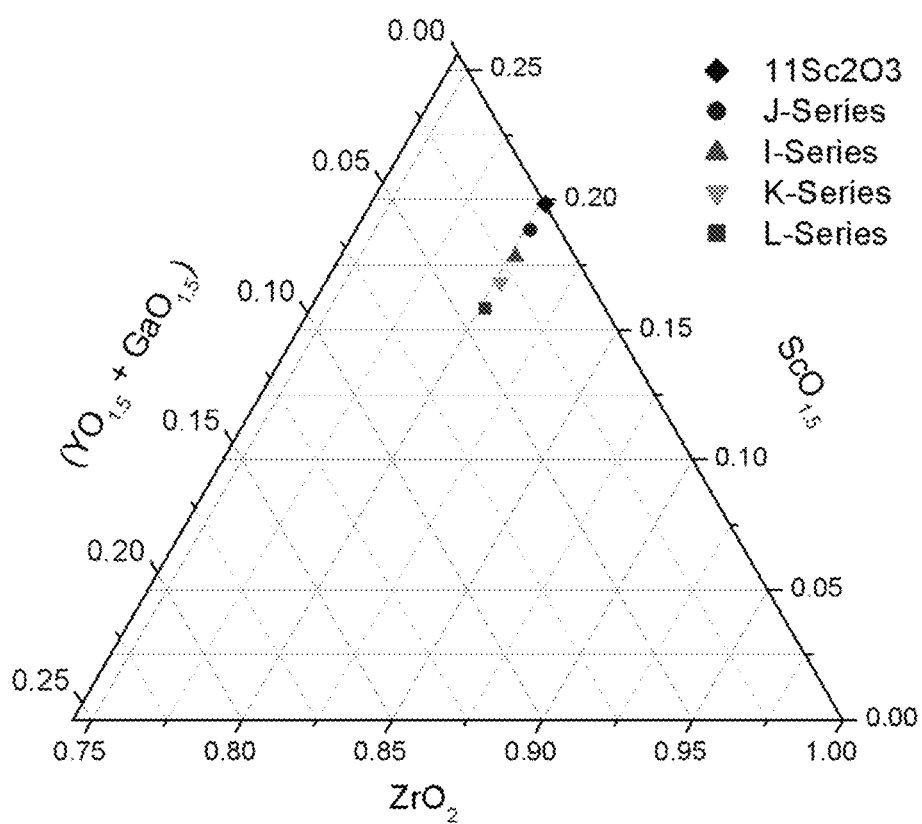
FIG. 15 is a ternary phase diagram of embodiment series of scandia stabilized zirconia compositions doped with varying amounts of yttria and gallium oxide.
Figure 16A:
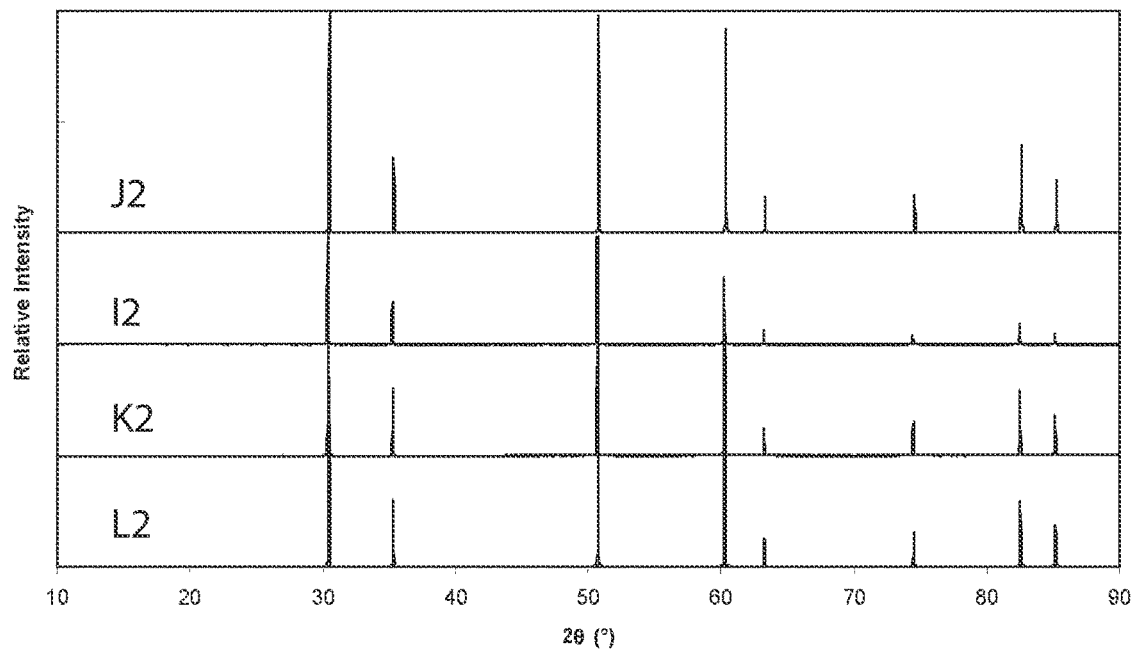
FIG. 16A is a plot showing x-ray diffraction patterns for sample compositions in embodiment series of scandia stabilized zirconia compositions doped with varying amounts of yttria and gallium oxide.
Figure 16B:
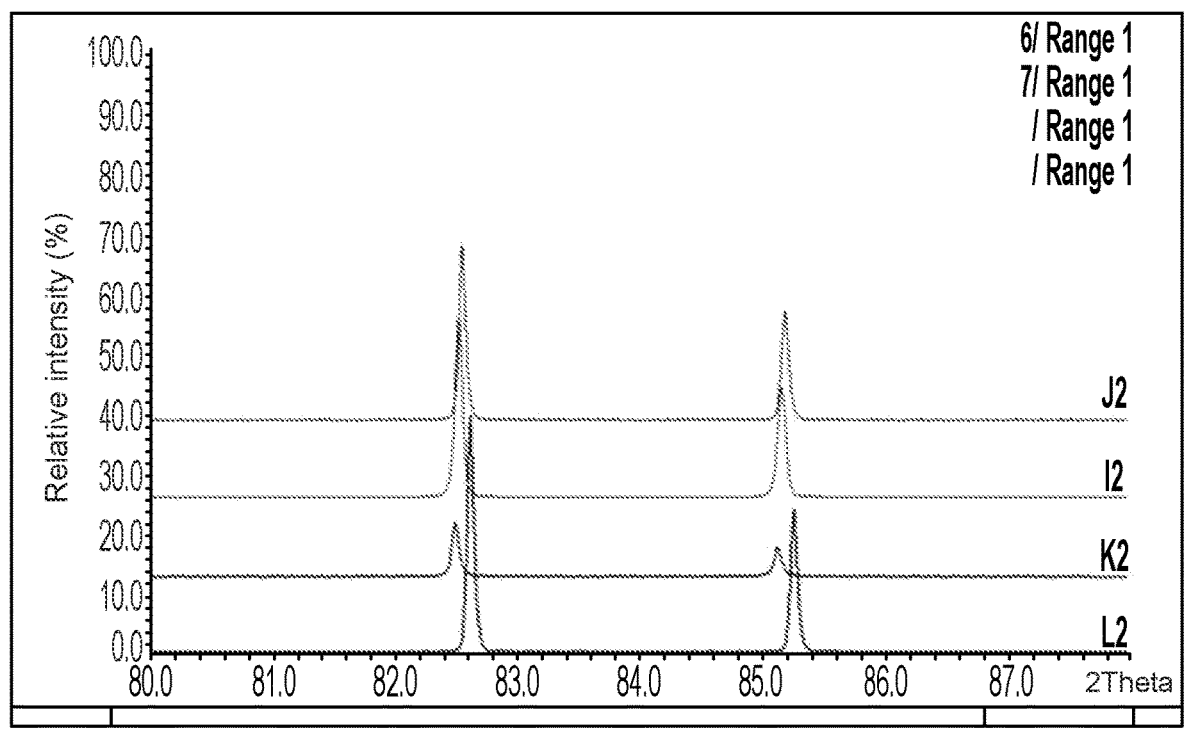
FIG. 16B is an expanded view of the x-ray diffraction patterns of FIG. 16A for angles within the range of $2\theta=82-85$.
Figure 17A:
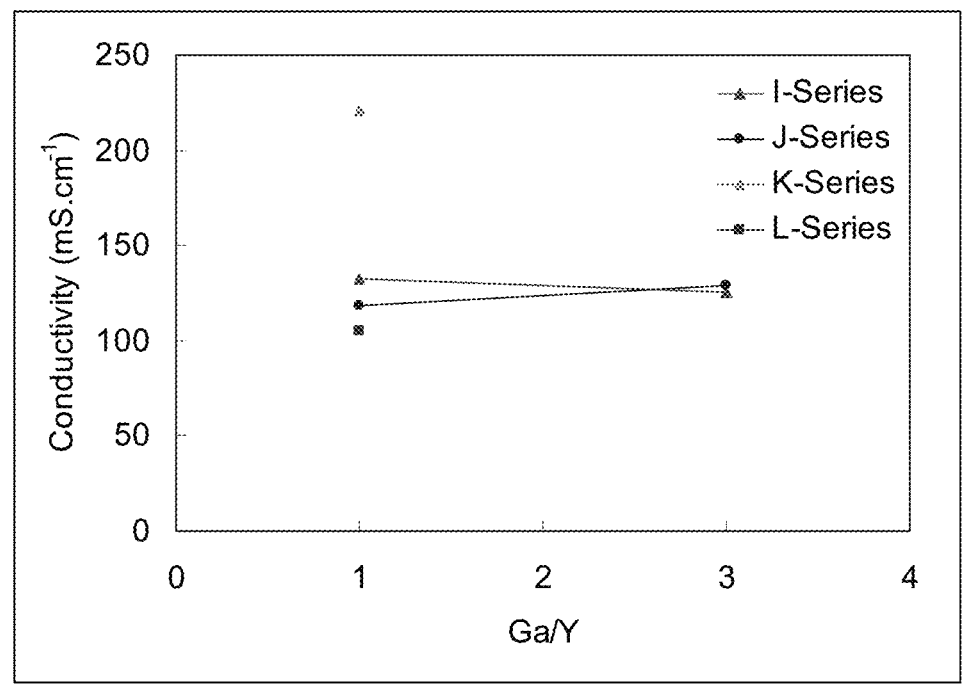
FIG. 17A is a graph showing D.C. conductivity versus atomic percentage of yttrium and gallium ions at 850° C. for embodiment series of scandia stabilized zirconia compositions doped with varying amounts of yttria and gallium oxide.
Figure 17B:
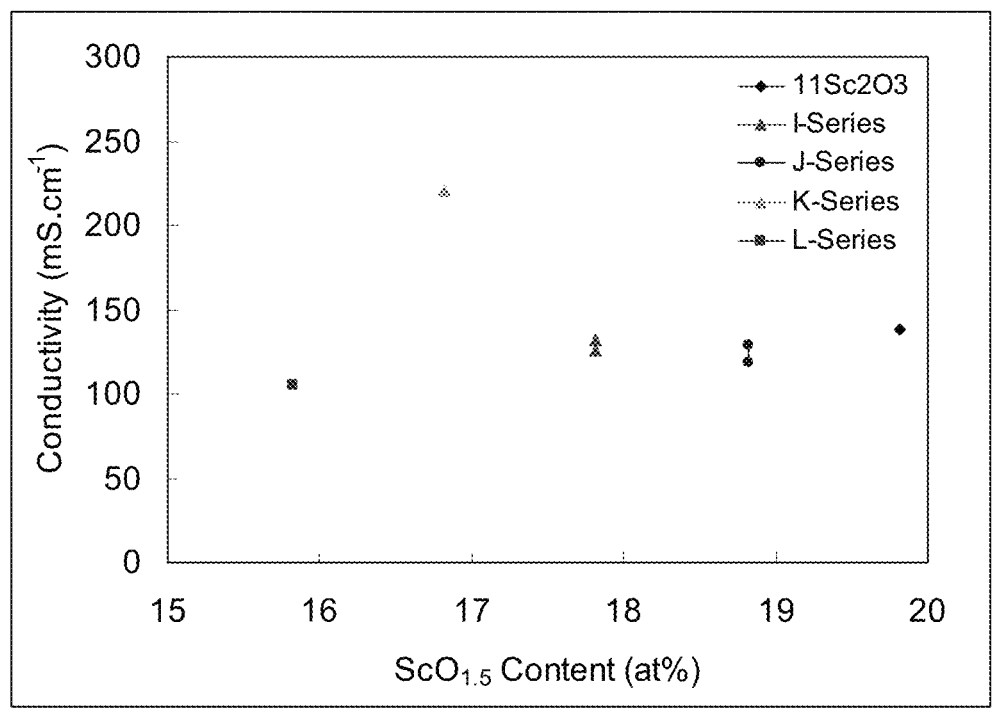
FIG. 17B is a graph showing D.C. conductivity versus atomic percentage of scandium ions at 850° C. for embodiment series of scandia stabilized zirconia compositions doped with varying amounts of yttria and gallium oxide.

FIG. 15 is a ternary phase diagram showing the example I-, J-, K- and L-series of compositions. FIG. 16A illustrates XRD patterns for sample compositions in these series, J2, J2, K2, and L2. FIG. 16B is an expansion of the XRD patterns over the range of $2\theta = 82-85°$. FIG. 17A illustrates the variation in D.C conductivity with total gallium oxide and yttria content (measured as atomic percent of gallium or yttrium) for the I, J, K and L series of compositions at 850° C. FIG. 17B illustrates the variation in D.C. conductivity with scandium content (measured as atomic percent of scandium). As the data show, the K-series composition, which has 0.015 at. % $Y^{3+}$ ions and 0.015 at. % $Ga^{3+}$ ions, has the highest conductivity, such as above 200 mS/cm, for example 221 mS/cm.

D.C. conductivities of sample compositions I2, I3, J2, J3, K2 and L2 at 850° C. are provided in Table 4 below:

| Composition | $\sigma_{850°\,C.}$ |
|---|---|
| I2 | 132 |
| I3 | 126 |
| J2 | 118 |
| J3 | 129 |
| K2 | 221 |
| L3 | 106 |

Another example series of compositions ("M-series") may be prepared with a formula $Zr_{0.815}Sc_{0.15}Y_{0.02-x}Ga_xMg_{0.015}O_{1.90}$. In this series of compositions, one $Ga^{3+}$ ion replaces one $Y^{3+}$ ion, while zirconium, scandium, magnesium and oxygen levels remain constant. The x values that may be used to prepare the M-series are 0, 0.01 and 0.02, thereby creating the following compositions:

M0: $Zr_{0.815}Sc_{0.15}Y_{0.02}Mg_{0.015}O_{1.9}$
M1: $Zr_{0.815}Sc_{0.15}Y_{0.01}Ga_{0.01}Mg_{0.015}O_{1.9}$
M2: $Zr_{0.815}Sc_{0.15}Ga_{0.02}Mg_{0.015}O_{1.9}$

At x=0, no yttrium ions are replaced, and no gallium is present, and at x=0.02, all yttrium ions are replaced with gallium ions.

D.C. conductivity results of the M-series compositions at 850° C. are provided in Table 5 below:

| Composition | $\sigma_{850°\,C.}$ |
|---|---|
| M0 | 179 |
| M1 | 154 |
| M2 | 162 |

Figure 18:
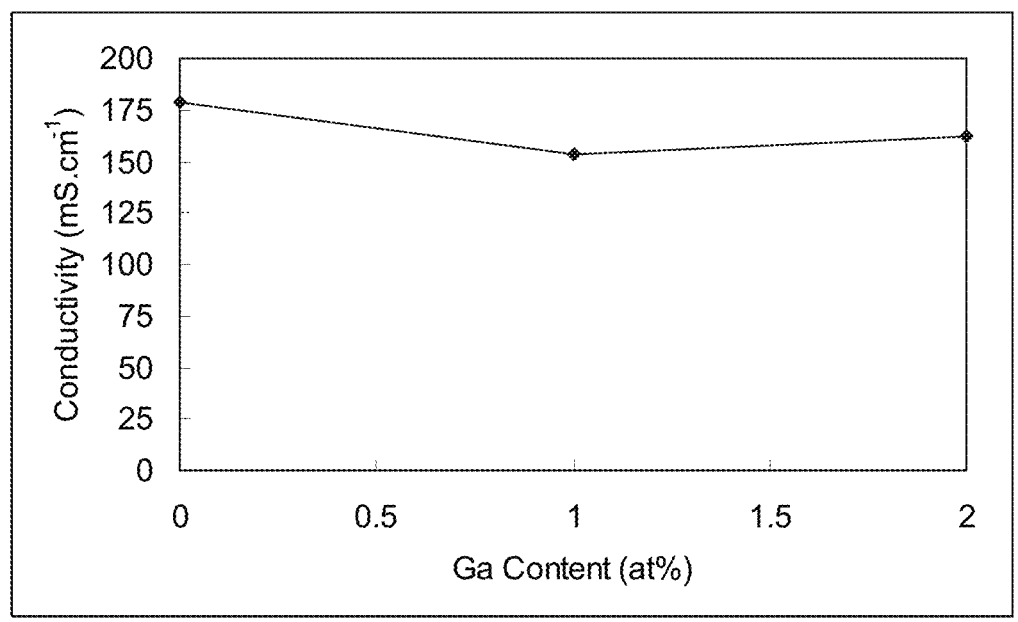
FIG. 18 is a graph showing D.C. conductivity versus atomic percentage of gallium ions at 850° C. for an embodiment series of scandia stabilized zirconia compositions doped with yttria, gallium oxide, and magnesia.

FIG. 18 is a graph illustrating the D.C. conductivity for the M-series compositions with varying gallium oxide content (measured as atomic percent gallium).

Another example series of compositions ("N-series") may be created with a formula $Zr_{0.815}Sc_{0.13}Y_{0.04-x}Ga_xMg_{0.015}O_{1.90}$. In this series of compositions, one $Ga^{3+}$ ion replaces one $Y^{3+}$ ion, while zirconium, scandium, magnesium and oxygen levels remain constant. The x values that may used to make the N-series are 0, 0.01, 0.02, 0.03, and 0.04, thereby creating the following compositions:

N0: $Zr_{0.815}Sc_{0.13}Y_{0.04}Mg_{0.015}O_{1.90}$
N1: $Zr_{0.815}Sc_{0.13}Y_{0.03}Ga_{0.01}Mg_{0.015}O_{1.90}$
N2: $Zr_{0.815}Sc_{0.13}Y_{0.02}Ga_{0.02}Mg_{0.015}O_{1.90}$
N3: $Zr_{0.815}Sc_{0.13}Y_{0.01}Ga_{0.03}Mg_{0.015}O_{1.90}$
N4: $Zr_{0.815}Sc_{0.13}Ga_{0.04}Mg_{0.015}O_{1.90}$

At x=0, no yttrium ions are replaced, and no gallium is present, and at x=0.04, all yttrium ions are replaced with gallium ions.

In further embodiments, scandia stabilized zirconia may be co-doped with indium oxide and ceria. An example series of compositions ("O-series") may be created with a formula $Zr_{0.809}Sc_{0.182-x}Ce_{0.009}In_xO_{2-d}$, where $0 \leq x \leq 0.164$. This series may also be written as $Zr_{0.809}Sc_{0.182-x}Ce_{0.009}In_xO_d$, where $1.8 \leq d \leq 2$ and $0 \leq x \leq 0.164$. In this series of compositions, $In^{3+}$ ions replace $Sc^{3+}$ ions in a 1:1 ratio, while zirconium, cerium, and oxygen levels remain constant. A parent dopant material for the O-series of compositions may be $10Sc_2O_3$-$1CeO_2$. Sample compositions may be created by replacing $Sc_2O_3$ with up to 9 mol % $In_2O_3$ (e.g., $9Sc_2O_3$-$1In_2O_3$-$1CeO_2$ to $1Sc_2O_3$-$9In_2O_3$-$1CeO_2$).

Other example compositions may be created with total dopant amounts lower than 11 mol %. For example, one series of compositions may be created with at least 8 mol %, such as 9 mol % of total dopant, and a formula $Zr_{0.843}Sc_{0.0926-x}Ce_{0.009}In_{0.0556+x}O_{2-d}$, where $0 \leq x \leq 0.0741$. The formula for this series may also be written as $Zr_{0.843}Sc_{0.0926-x}Ce_{0.009}In_{0.556+x}O_d$, where $1.8 \leq d \leq 2$ and $0 \leq x \leq 0.0741$. In this series of compositions, $In^{3+}$ ions replace $Sc^{3+}$ ions in a 1:1 ratio, while zirconium, cerium, and oxygen levels remain constant. A parent dopant material may comprise $5Sc_2O_3$-$3In_2O_3$-$1CeO_2$. Sample compositions may be created by replacing $Sc_2O_3$ with up to 4 mol % $In_2O_3$ (e.g., $5Sc_2O_3$-$3In_2O_3$-$1CeO_2$ to $1Sc_2O_3$-$7In_2O_3$-$1CeO_2$). In another example, a series of compositions ("P-series") may be created with 10 mol % of total dopant, and a formula $Zr_{0.825}Sc_{0.110-x}Ce_{0.009}In_{0.055+x}O_{2-d}$, where $0 \leq x \leq 0.0917$. The formula for the P-series may also be written as $Zr_{0.825}Sc_{0.110-x}Ce_{0.009}In_{0.055+x}O_d$, where $1.8 \leq d \leq 2$ and $0 \leq x \leq 0.0917$. In this series of compositions, $In^{3+}$ ions replace $Sc^{3+}$ ions in a 1:1 ratio, while zirconium, cerium, and oxygen levels remain constant. A parent dopant material may be $6Sc_2O_3$-$3In_2O_3$-$1CeO_2$. Sample compositions may be created by replacing $Sc_2O_3$ with up to 5 mol % $In_2O_3$ (e.g., $6Sc_2O_3$-$3In_2O_3$-$1CeO_2$ to $1Sc_2O_3$-$8In_2O_3$-$1CeO_2$). Some x values that may used to make the P-series are 0 and 0.018, thereby creating the following compositions:

P0: $Zr_{0.825}Sc_{0.110}Ce_{0.009}In_{0.055}O_{1.92}$
P1: $Zr_{0.825}Sc_{0.092}Ce_{0.009}In_{0.073}O_{1.92}$

At x=0, no additional scandium ions are replaced, and the amount of indium present is the same as in the parent dopant material.

Other embodiment compositions may be created with total dopant amounts that are higher than 11 mol %, such as up to 14 mol %. For example, one series of compositions ("Q-series") may be created with 11.5 mol % of total dopant, and a formula $Zr_{0.801}Sc_{0.10-x}Ce_{0.009}In_{0.091+x}O_{2-d}$, where $0 \leq x \leq 0.082$. The formula for the Q-series may also be written as $Zr_{0.801}Sc_{0.10-x}Ce_{0.009}In_{0.091+x}O_d$, where $1.8 \leq d \leq 2$ and $0 \leq x \leq 0.082$. In this series of compositions, $In^{3+}$ ions replace $Sc^{3+}$ ions in a 1:1 ratio, while zirconium, cerium, and oxygen levels remain constant. A parent dopant material may be $5.5Sc_2O_3$-$5In_2O_3$-$1CeO_2$. Sample compositions may be created by replacing $Sc_2O_3$ with up to 4.5 mol % $In_2O_3$ (e.g., $5.5Sc_2O_3$-$5In_2O_3$-$1CeO_2$ to $1Sc_2O_3$-$9.5In_2O_3$-$1CeO_2$). Some x values that may used to make the Q-series are 0 and 0.010, thereby creating the following compositions:

Q0: $Zr_{0.801}Sc_{0.10}Ce_{0.009}In_{0.091}O_{1.91}$
Q1: $Zr_{0.825}Sc_{0.091}Ce_{0.09}In_{0.10}O_{1.91}$

At x=0, no additional scandium ions are replaced, and the amount of indium present is the same as in the parent dopant material.

In another example, a series of compositions ("R-series") may be created with 12 mol % of total dopant, and a formula $Zr_{0.793}Sc_{0.110-x}Ce_{0.009}In_{0.090+x}O_{2-d}$, where $0 \leq x \leq 0.09$. The formula for the R-series may also be written as $Zr_{0.793}Sc_{0.110-x}Ce_{0.009}In_{0.090+x}O_d$, where $1.8 \leq d \leq 2$ and $0 \leq x \leq 0.09$. In this series of compositions, $In^{3+}$ ions replace $Sc^{3+}$ ions in a 1:1 ratio, while zirconium, cerium, and oxygen levels remain constant. A parent dopant material may be $6Sc_2O_3$-$5In_2O_3$-$1CeO_2$. Sample compositions may be created by replacing $Sc_2O_3$ with up to 5 mol % $In_2O_3$ (e.g., $6Sc_2O_3$-$5In_2O_3$-$1CeO_2$ to $1Sc_2O_3$-$10In_2O_3$-$1CeO_2$). Some x values that may used to make the R-series are 0, 0.009, and 0.018, thereby creating the following compositions:

R0: $Zr_{0.793}Sc_{0.110}Ce_{0.009}In_{0.090}O_{1.90}$
R1: $Zr_{0.793}Sc_{0.101}Ce_{0.009}In_{0.099}O_{1.90}$
R2: $Zr_{0.793}Sc_{0.092}Ce_{0.009}In_{0.108}O_{1.90}$

At x=0, no additional scandium ions are replaced, and the amount of indium present is the same as in the parent dopant material.

In another embodiment, a related series of compositions (R'-series) also having a total of 12 mol % dopant may be created with scandia stabilized zirconia that is co-doped only with indium, and lacks cerium or ceria. The R'-series may have a formula $Zr_{0.786}Sc_{0.143-x}In_{0.071+x}O_{2-d}$, where $0 \leq x \leq 0.125$. The formula for the R'-series may also be written as $Zr_{0.786}Sc_{0.143-x}In_{0.071+x}O_d$, where $1.8 \leq d \leq 2$ and $0 \leq x \leq 0.125$. In this series of compositions, $In^{3+}$ ions replace $Sc^{3+}$ ions in a 1:1 ratio, while zirconium and oxygen levels remain constant. A parent dopant material may be $8Sc_2O_3$-$4In_2O_3$. Sample compositions may be created by replacing $Sc_2O_3$ with up to 7 mol % $In_2O_3$ (e.g., $8Sc_2O_3$-$4In_2O_3$ to $1Sc_2O_3$-$11In_2O_3$). Some x values that may used to make the R-series are 0 and 0.036, thereby creating the following compositions:

R'0: $Zr_{0.786}Sc_{0.143}In_{0.071}O_{1.89}$
R'1: $Zr_{0.786}Sc_{0.107}In_{0.107}O_{1.89}$

At x=0, no additional scandium ions are replaced, and the amount of indium present is the same as in the parent dopant material. At x=0.036, the amounts of indium and scandium are equal in the dopant material.

In another example, a series of compositions ("S-series") having 13 mol % of total dopant may be created using scandia stabilized zirconia co-doped with indium oxide and ceria. The S-series may have a formula $Zr_{0.777}Sc_{0.107-x}Ce_{0.009}In_{0.107+x}O_{2-d}$, where $0 \leq x \leq 0.089$. The formula for the S-series may also be written as $Zr_{0.777}Sc_{0.107-x}Ce_{0.009}In_{0.107+x}O_d$, where $1.8 \leq d \leq 2$ and $0 \leq x \leq 0.089$. In this series of compositions, $In^{3+}$ ions replace $Sc^{3+}$ ions in a 1:1 ratio, while zirconium, cerium, and oxygen levels remain constant. A parent dopant material may be $6Sc_2O_3$-$6In_2O_3$-$1CeO_2$. Sample compositions may be created by replacing $Sc_2O_3$ with up to 5 mol % $In_2O_3$ (e.g., $6Sc_2O_3$-$6In_2O_3$-$1CeO_2$ to $1Sc_2O_3$-$11In_2O_3$-$1CeO_2$). Some x values that may used to make the S-series are 0 and 0.018, thereby creating the following compositions:

S0: $Zr_{0.777}Sc_{0.107}Ce_{0.009}In_{0.090}O_{1.87}$
S1: $Zr_{0.793}Sc_{1.101}Ce_{0.009}In_{0.099}O_{1.87}$

In another embodiment, a related series of compositions (S'-series) also having a total of 13 mol % dopant may be created with scandia stabilized zirconia that is co-doped only with indium. The S'-series may have a formula $Zr_{0.770}Sc_{0.142-x}In_{0.088+x}O_{2-d}$, where $0 \leq x \leq 0.125$. The formula for the S'-series may also be written as $Zr_{0.770}Sc_{0.142-x}In_{0.088+x}O_d$, where $1.8 \leq d \leq 2$ and $0 \leq x \leq 0.125$. In this series of compositions, $In^{3+}$ ions replace $Sc^{3+}$ ions in a 1:1 ratio, while zirconium and oxygen levels remain constant. A parent dopant material may be $8Sc_2O_3$-$5In_2O_3$. Sample compositions may be created by replacing $Sc_2O_3$ with up to 7 mol % $In_2O_3$ (e.g., $8Sc_2O_3$-$5In_2O_3$ to $1Sc_2O_3$-$12In_2O_3$).

Figure 19A:
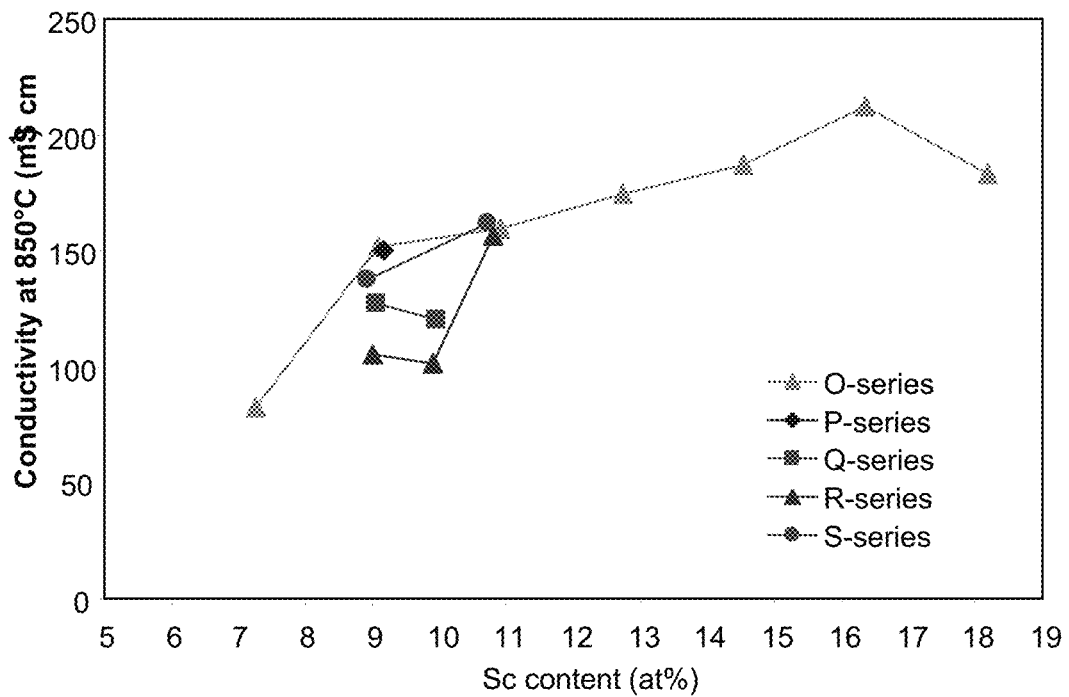
FIG. 19A is a graph showing D.C. conductivities as a function of scandium content for sample compositions of various series of scandia stabilized zirconia doped with indium oxide and ceria at 850° C.
Figure 19B:
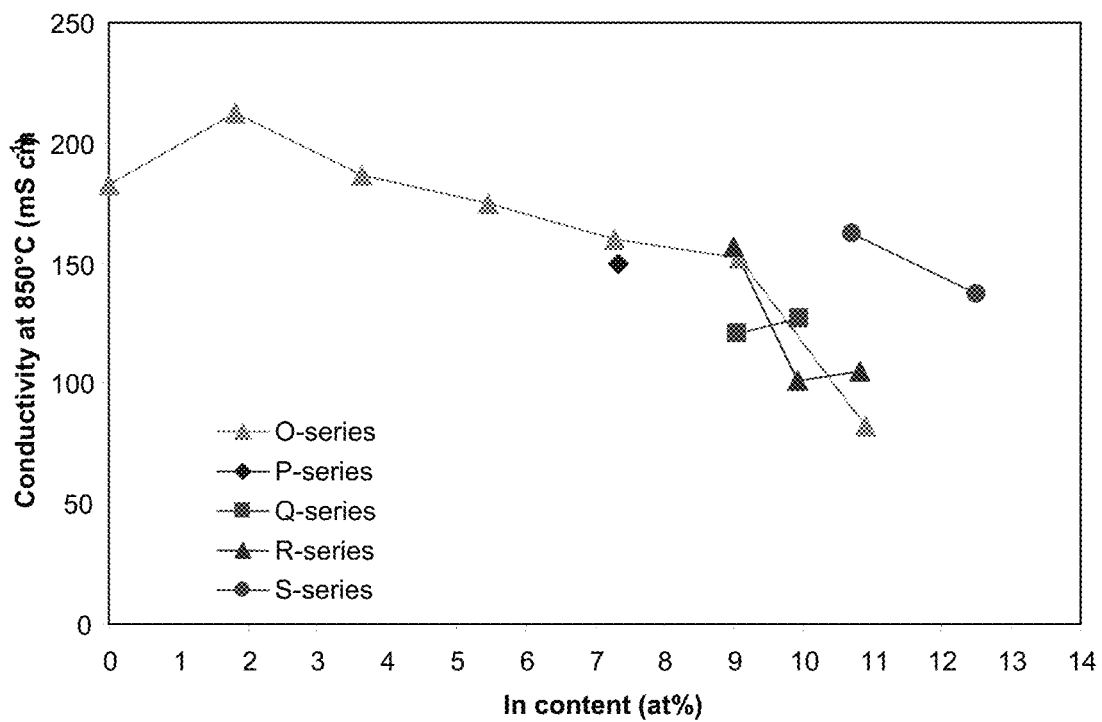
FIG. 19B is a graph showing D.C. conductivities as a function of indium content for sample compositions of various series of scandia stabilized zirconia doped with indium oxide and ceria at 850° C.
Figure 19C:
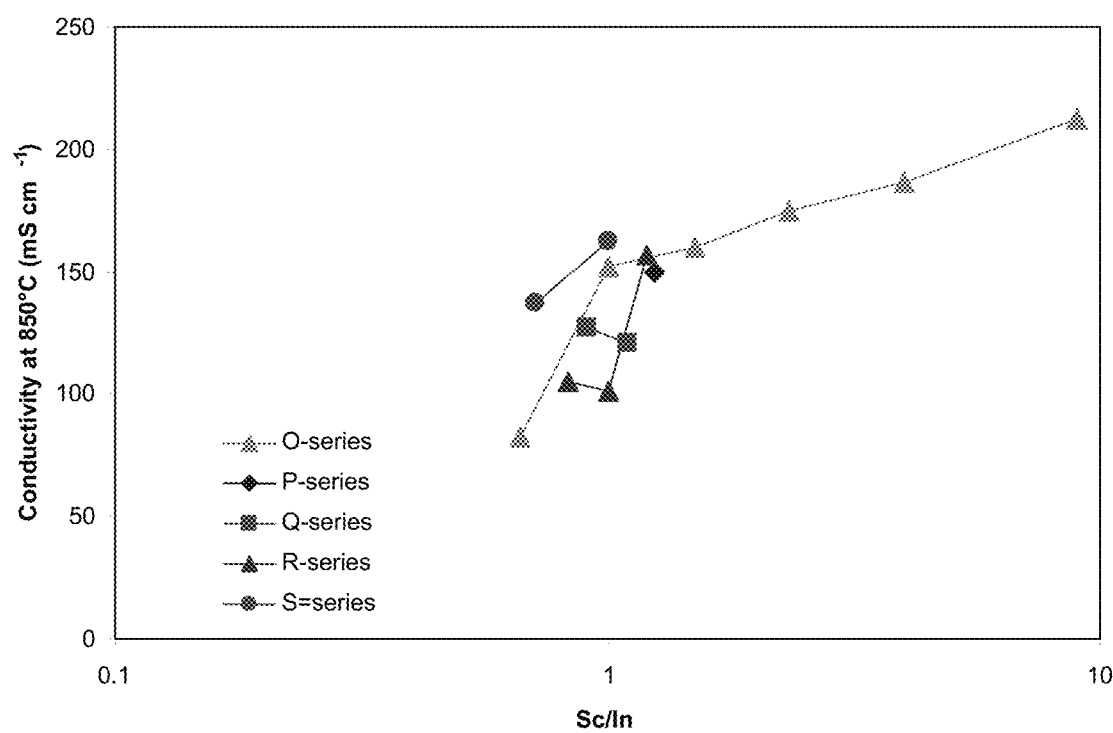
FIG. 19C is a graph showing D.C. conductivities as a function of the ratio of scandium to indium for sample compositions of various series of scandia stabilized zirconia doped with indium oxide and ceria at 850° C.

FIGS. 19A-19C are graphs illustrating the variation in D.C. conductivity for sample compositions of the O-series, P-series, Q-series, R-series, and S-series. FIG. 19A shows D.C. conductivity of sample compositions in these series as a function of discrete integer scandium content (measured as at. % $Sc^{3+}$), where scandium content varies from 7.2 to 18.2 at. %. FIG. 19B shows the variation in D.C. conductivity of the sample compositions as a function of indium content (measured as at. % $In^{3+}$), where indium content varies from 0 to 10.9 at. %. FIG. 19C shows the variation in D.C. conductivity of the sample compositions as a function of the ratio of scandium content to indium content (excluding an O-series sample in which dopant composition had 0% indium oxide).

As shown by the data plots, D.C. conductivity of the samples may be a value between 80 mS/cm and 220 mS/cm. As also shown by the data plot, a peak D.C. conductivity level of at least 215 mS/cm, such as between 215 and 220 mS/cm, may be achieved in the O-series in a sample with around 16.3 at. % scandium, and around 1.8 at % indium, which has a sample formula of around $Zr_{0.809}Sc_{0.163}Ce_{0.009}In_{0.018}O_{1.9}$. The amounts of scandium and indium at the peak D.C. conductivity level correspond to a dopant material of 9 mol % $Sc_2O_3$, 1 mol % $In_2O_3$, and 1 mol % $CeO_2$. Thus, the O-series this series may be described as having a formula $Zr_{1-w-y-z}Sc_wCe_zIn_yO_d$, in which $0.072 \leq w \leq 0.182$, in which $0 \leq y \leq 0.1098$, in which $0.008 \leq z \leq 0.1$, and in which $1.8 \leq d \leq 2$. In an embodiment, scandium ion concentration (w) may be characterized by w=0.182−y, and cerium ion concentration (z) may be characterized by z=0.009. In another embodiment, indium ion concentration (y) may be characterized by y=0.018.

Figure 20A:
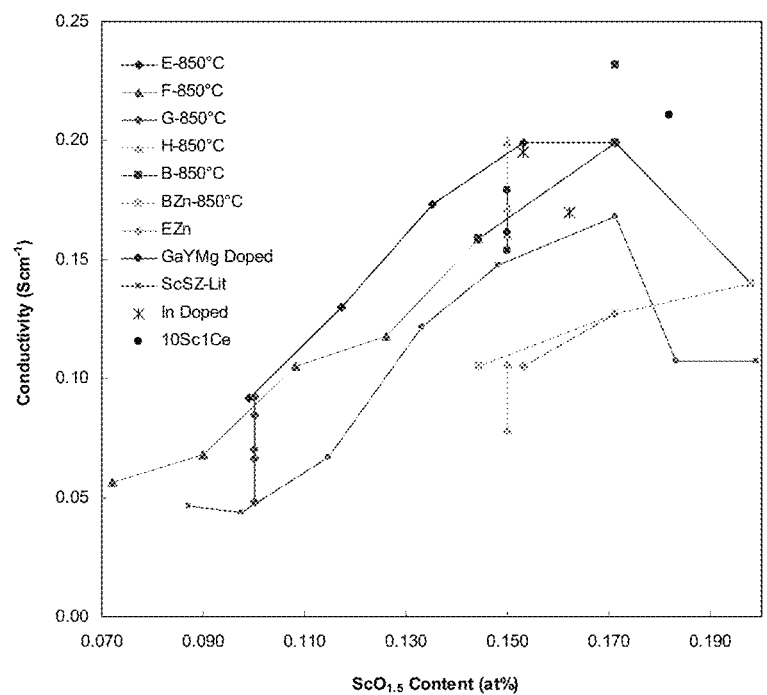
FIG. 20A is a graph showing D.C. conductivity as a function of scandium content at 850° C. for embodiment series of scandia stabilized zirconia compositions with various dopant combinations.
Figure 20B:
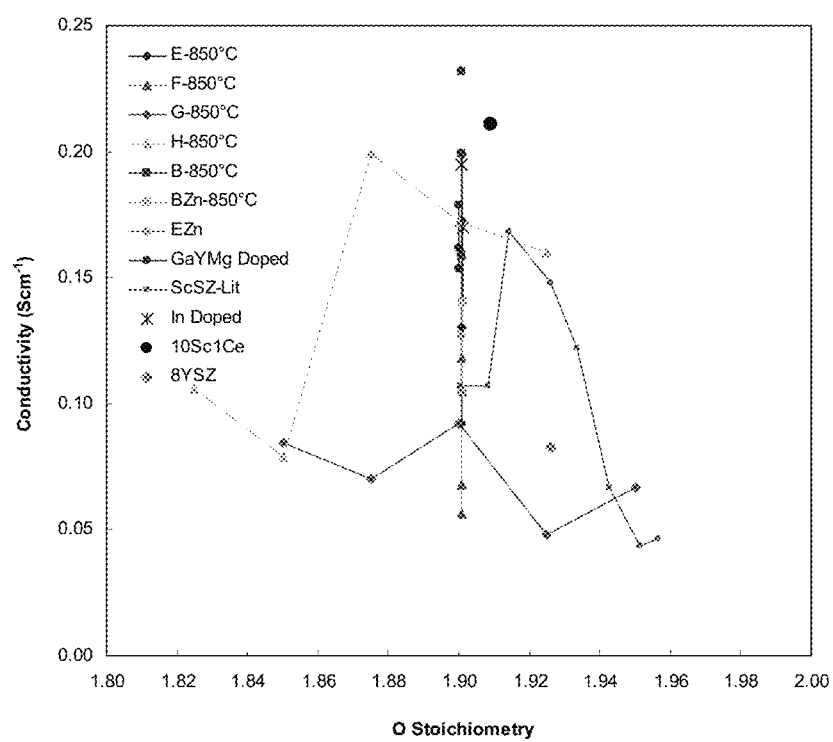
FIG. 20B is a graph showing D.C. conductivity as a function of oxygen stoichiometry at 850° C. for embodiment series of scandia stabilized zirconia compositions with various dopant combinations.

FIGS. 20A and 20B are graphs illustrating summaries of the D.C. conductivity results for various example series of scandia stabilized zirconia compositions that may have the properties discussed above. FIG. 20A shows D.C. conductivity of sample compositions in these series as a function of discrete integer scandium content (measured as at. % $Sc^{3+}$). FIG. 20B shows D.C. conductivity of the sample compositions in these series as a function of oxygen stoichiometry.

Figure 21:
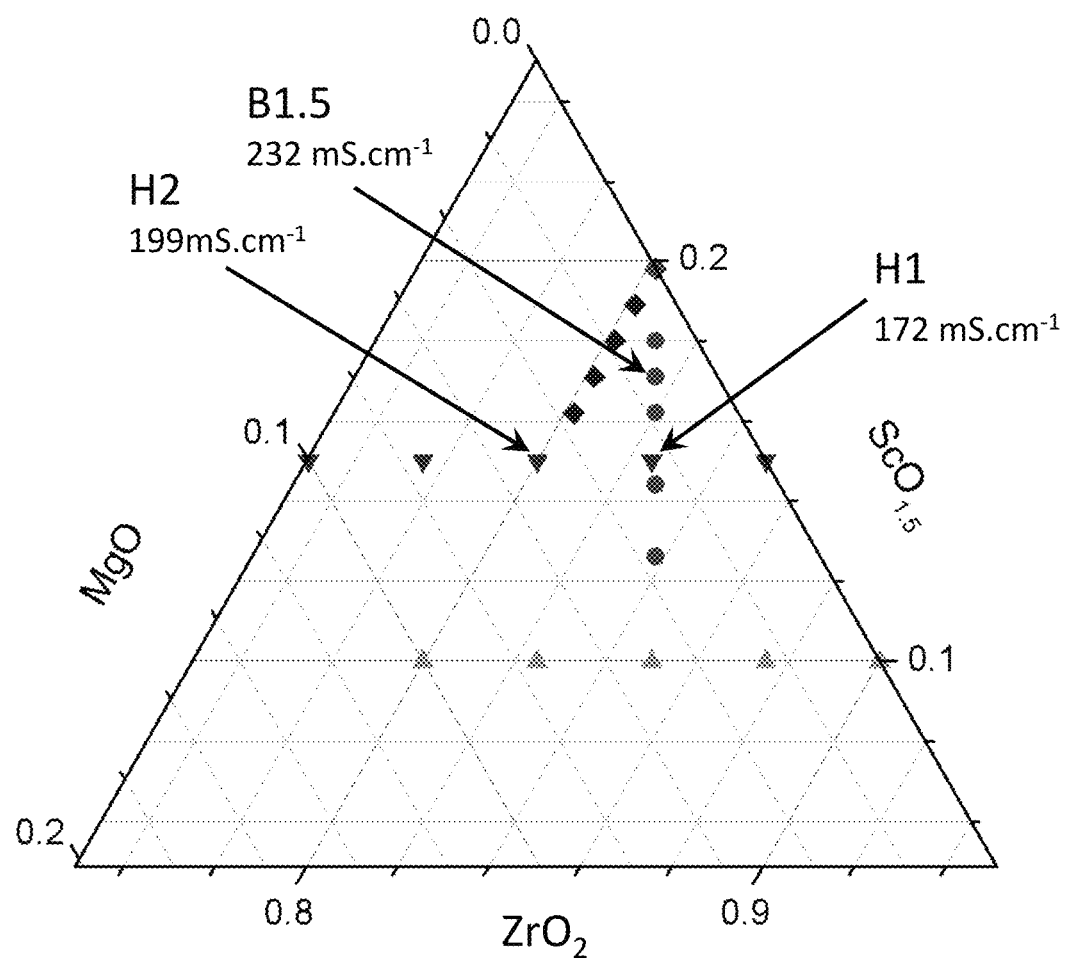
FIG. 21 is a ternary phase diagram showing sample high conductivity compositions of two embodiment series of scandia stabilized zirconia compositions doped with magnesia.

FIG. 21 is a ternary phase diagram showing sample high conductivity compositions of embodiment B- and H-series scandia stabilized zirconia that is doped with magnesia.

As demonstrated in the various example series of scandia stabilized zirconia compositions, the B- and H-series compositions may have high relative conductivities. For example, a sample B1.5 composition may have a D.C. conductivity of 232 mS/cm. In another example, sample H2 and H1 compositions may have D.C. conductivities of 199 mS/cm and 171 mS/cm, respectively.

In another example, a sample K2 composition may have a relatively high conductivity of 145 mS/cm. In another example, a sample L2 composition may also have a relatively high conductivity of 145 mS/cm. In another example, compositions doped $In_2O_3$ may have relatively high conductivities around 195 mS/cm.

The compositions above may be used for a solid oxide fuel cell electrolyte. The electrolyte may be plate shaped with an anode electrode on one side (e.g., a nickel and stabilized zirconia and/or doped ceria cermet) and a cathode electrode (e.g., lanthanum strontium manganate) on the opposite side. The fuel cell comprising the electrolyte, anode and cathode electrodes may be located in a fuel cell stack. The term "fuel cell stack," as used herein, means a plurality of stacked fuel cells separated by interconnects which may share common air and fuel inlet and exhaust passages, manifolds or risers. The "fuel cell stack," as used herein, includes a distinct electrical entity which contains two end plates which are connected to power conditioning equipment and the power (i.e., electricity) output of the stack. Thus, in some configurations, the electrical power output from such a distinct electrical entity may be separately controlled from other stacks. The term "fuel cell stack" as used herein, also includes a part of the distinct electrical entity. For example, the stacks may share the same end plates. In this case, the stacks jointly comprise a distinct electrical entity, such as a column. In this case, the electrical power output from both stacks cannot be separately controlled.

The formulas that represent the compositions above are not intended to limit the scope of the invention to particular atomic or mole percentages, but are provided to facilitate disclosure of the various series of related compositions. For example, the representation of oxygen as "$O_2$-d" Or "$O_d$" provides for a variable amount of oxygen that may depend, for example, on the total amount of doping, valence of cations in the composition, etc. Example amounts of oxygen that may be present in series of compositions discussed above include, without limitation: 1.92 at % oxygen in the P-series; 1.91 at % oxygen in the Q-series, 1.90 at % oxygen in the R-series; 1.89 at % oxygen in the R'-series; and 1.87 at % oxygen in the S-series.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

The invention claimed is:

1. An electrolyte composition for a solid oxide fuel cell, comprising zirconia stabilized with scandia and magnesia;
   wherein the electrolyte composition comprises a formula $Zr_{1-w-x-z}Sc_wMg_xIn_zO_d$, wherein $0.1 \leq w \leq 0.18$, wherein $0 \leq x \leq 0.03$, wherein $0.01 \leq z \leq 0.12$, and wherein $1.8 \leq d \leq 2$.

2. The electrolyte composition of claim 1, wherein $w=0.171-z$, wherein $0.013 \leq x \leq 0.014$, and wherein $0.018 \leq z \leq 0.06$.

3. The electrolyte composition of claim 1, wherein $z=0.018$ or $z=0.036$.

* * * * *